United States Patent [19]
Makino et al.

[11] Patent Number: 5,066,083
[45] Date of Patent: Nov. 19, 1991

[54] SCANNING OPTICAL SYSTEM

[75] Inventors: Jun Makino; Masamichi Tateoka, both of Yokohama, Japan

[73] Assignee: Canon Kabushiki Kaisha, Tokyo, Japan

[21] Appl. No.: 639,386

[22] Filed: Jan. 11, 1991

Related U.S. Application Data

[63] Continuation of Ser. No. 332,041, Apr. 3, 1989, abandoned.

[30] Foreign Application Priority Data

Apr. 5, 1988 [JP] Japan .................................. 63-84490
May 17, 1988 [JP] Japan ................................ 63-121090

[51] Int. Cl.$^5$ ........................................ G02B 26/08
[52] U.S. Cl. ..................................... 359/213; 359/217
[58] Field of Search ..................... 350/6.1, 6.9, 6.91, 350/6.5, 6.6, 6.7, 6.8

[56] References Cited

U.S. PATENT DOCUMENTS

| | | | |
|---|---|---|---|
| 3,814,494 | 6/1974 | Shiragai et al. | 350/6.91 |
| 4,256,364 | 3/1981 | Minoura et al. | 350/6.9 |
| 4,627,685 | 12/1986 | Sakuma | 350/6.8 |
| 4,758,059 | 7/1988 | Sakuma | 350/6.8 |
| 4,915,465 | 4/1990 | Sugiura | 350/6.91 |

FOREIGN PATENT DOCUMENTS

| | | |
|---|---|---|
| 3022365 | 5/1981 | Fed. Rep. of Germany . |
| 58-189609 | 11/1983 | Japan . |
| 2185167 | 7/1987 | United Kingdom . |

Primary Examiner—Loha Ben
Attorney, Agent, or Firm—Fitzpatrick, Cella, Harper & Scinto

[57] ABSTRACT

The present invention relates to a scanning optical system and a scanning optical apparatus in which the pivot axis and the mirror surface of the deflector are inclined to have a predetermined relationship so as to obtain practical planeness of a surface to be scanned. A scanning optical system according to the present inhvention comprises a light source, lens for converging a light beam from the light source and a deflector for deflecting the light beam in a predetermined direction. In the optical scanning system according to the present invention, the maximum deflection angle of the deflector, a relationship between a radius of curvature of the deflection/reflection surface of the deflector and a distance between an object point of a light beam incident on the deflection/reflection surface of the deflector and the deflection/reflection surface for reflecting a central ray of the incident light beam, are determined to satisfy with a predetermined condition. And further, a relationship between an angle defined by a predetermined pivot axis of the deflector and the deflection/reflection surface of the deflector and an incident angle of the light beam from the light source to the deflection/reflection surface of the deflector within a plane including the predetermined axis and perpendicular to the deflection plane when the light beam emerging from the deflector is present within a single plane, is determined to satisfy with a predetermined condition.

17 Claims, 16 Drawing Sheets

SCANNING OPTICAL SYSTEM

This application is a continuation of application Ser. No. 07/332,041 filed Apr. 3, 1989, now abandoned.

BACKGROUND OF THE INVENTION:

1. Field of the Invention

The present invention relates to a scanning optical system and a scanning optical apparatus for performing data recording on a surface to be scanned using the scanning optical system.

2. Related Background Art

Conventionally, a deflector used in a scanning optical system adopts a polygonal mirror in which a deflection velocity of a light beam is equiangular or a galvano mirror (sinusoidal oscillation mirror) in which a deflection velocity of a light beam is not equiangular.

FIGS. 1 to 3 are schematic views showing general arrangements of a scanning optical apparatus using a scanning system. For the sake of simplicity, a description will be made while an optical system for inclination correction is not necessary.

FIG. 1 shows an example wherein a galvano mirror is used as the deflector. A light beam emitted from a light source 101 is collimated to a parallel beam by a collimator lens 102, and the parallel beam is incident on a mirror surface of a galvano mirror 103. The beam is reflected by the mirror surface, passes through an arcsin$\theta$ lens 104, and forms an image on a surface 106 to be scanned through a cylindrical lens 105. A photosensitive drum 107 for recording the light source is located at the surface 106. The light beam becomes incident on the galvano mirror 103 within a plane perpendicular to the surface 106 and including a pivot axis 108 of the deflector (this plane will be referred to as a z-x plane under an assumption that a coordinate system shown in FIG. 1 is given for the sake of simplicity). The cylindrical lens 105 is inserted for the purpose of correcting a curve of an image surface to be scanned in a z direction during rotation of the mirror surface. Note that in FIG. 1, 109 indicates a driver for the galvano mirror 103.

FIG. 2 shows an example wherein a polygonal mirror is used as the deflector. A light beam emitted from a light source 101 is collimated to a parallel beam by a collimator lens 102, and is incident on a mirror surface of a polygonal mirror 110. The parallel beam is reflected by the mirror surface, and forms an image on a surface 106 to be scanned through an f-$\theta$ lens 111. The light beam becomes incident on the polygonal mirror 110 within a plane perpendicular to the surface 106 and a pivot axis 108 of the deflector. This plane is called a y-x plane for the sake of descriptive convenience.

FIG. 3 shows another example wherein a polygonal mirror is used as the deflector. A light beam emitted from a light source 101 is collimated into a parallel beam by a collimator lens 102, and is incident on the mirror surface of a polygonal mirror 110. The parallel beam is reflected by the mirror surface, and is imaged onto the surface 106 to be scanned through an f-$\theta$ lens 111 and a cylindrical lens 105. A laser beam becomes incident on the polygonal mirror 110 within the z-x plane. The cylindrical lens 105 is inserted for the purpose of correcting a curve of an image surface to be scanned in a z direction during rotation of the mirror surface. Note that in FIG. 3, 112 indicates a driver for the polygonal mirror 110.

In the scanning optical apparatus with the above arrangement, a curve of an image surface caused by scanning a light beam upon pivotal movement of the mirror surface of the deflector must be corrected, and a scanning speed of an image on the surface to be scanned by pivotal movement of the deflector must be rendered constant. For this purpose, a plurality of lens systems are required. These lens systems are generally difficult to design, have complicated structures, and hence are expensive. For this reason, the direction of a light beam reflected by the mirror surface is preferably symmetrical within a single plane.

In the example of FIG. 2 of the above-mentioned examples, since the light beam becomes incident on the mirror surface within a plane perpendicular to the surface 106 to be scanned and the pivot axis 108 of the deflector, the reflected light beam is deflected within the same plane. However, the direction of the light beam reflected upon rotation of the polygonal mirror 110 becomes asymmetrical, and the curve of the image surface to be scanned also becomes asymmetrical. Therefore, the structure of a lens system for correcting this is complicated.

When the light beam is incident on the mirror surface from a point within the z-x plane like in FIGS. 1 and 3, symmetricity of the light beam to be reflected can be assured. However, since the image surface of the light beam to be scanned is curved in the z direction upon rotation of the mirror surface, the cylindrical lens 105 must be arranged so as to correct the curve. The cylindrical lens is also used for correcting an inclination error of the mirror surface. The curve in the z direction is larger than the influence caused by an inclination of an angle of the mirror surface, design, manufacture, and adjustment of the cylindrical lens are generally difficult, and this also makes the f-$\theta$ lens and arcsin$\theta$ lens difficult to design as well as the cylindrical lens.

SUMMARY OF THE INVENTION

It is an object of the present invention to provide a scanning optical system which can eliminate the conventional drawbacks, can easily design a lens system from a reflection surface of a deflector to a surface to be scanned, or can omit a lens system.

A scanning optical system according to the present invention comprises:
 a light source;
 a lens for converging a light beam from the light source; and
 a deflector for deflecting the converged light beam from the lens in a predetermined direction, the deflector having a deflection/reflection surface which sinusoidally oscillates, wherein when a maximum deflection angle of the deflector is represented by $\psi_{max}$ within a deflection plane of the deflector, the following condition is satisfied:

$$38° \leq \psi_{max} \leq 50°$$

A scanning optical system according to the present invention comprises:
 a light source;
 a lens for converging a light beam from the light source; and
 a deflector for deflecting the converged light beam from the lens in a predetermined direction, the deflector having a deflection/reflection surface which sinusoidally oscillates, wherein when a radius of curvature of the deflection/reflection surface of the deflector is represented by r, and a distance between an object point of a light beam incident on the deflection/reflection surface of the deflector and the deflection/reflection surface for reflecting a central ray of the incident light beam is represented by s in a deflection plane of the deflector, the following condition is satisfied:

$$0.35 \leq s/r \leq 0.45$$

A scanning optical system according to the present invention comprises:

a light source;

a lens for converging a light beam from the light source; and a deflector for deflecting the converged light beam from the light source in a predetermined direction, the deflector having a deflection/reflection surface and being pivoted about a predetermined axis, and the predetermined axis and the light beam from the light source incident on the deflector being present within a single plane, wherein when the light beam incident on the deflector and a light beam emerging from the deflector are present within a single plane, if an angle defined by the predetermined axis and the deflection/reflection surface of the deflector is represented by $\beta$ and an incident angle of the light beam from the light source to the deflection/reflection surface of the deflector is represented by $\alpha$ within a plane including the predetermined axis and perpendicular to a deflection plane, the following condition is satisfied:

$$0.5 \times 2\alpha < \beta < 1.2 \times 2\beta$$

DETAILED DESCRIPTION OF THE PREFERRED EMBODIMENTS:

The present invention will be described with reference to illustrative embodiments.

In the present invention, a scanning optical system using a sinusoidal oscillation mirror which can obtain practical evenness of a scanning speed and planeness of a surface to be scanned without performing correction of a signal period by an electrical circuit or the like will be described first, and then, a scanning optical system using a deflector which can obtain practical planeness of a surface to be scanned by arranging a pivot axis and a mirror surface of the deflector to be inclined in a predetermined relationship will be described.

A scanning optical system using a sinusoidal oscillation mirror will be explained below with reference to FIGS. 4 to 15.

Figure 4:
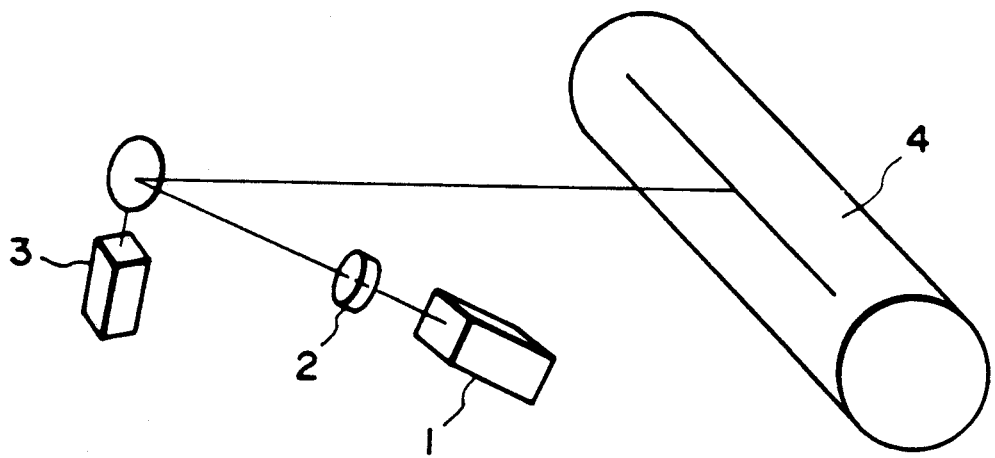
FIG. 4 is a schematic view showing a scanning optical apparatus according to an embodiment of the present invention.
Figure 5:
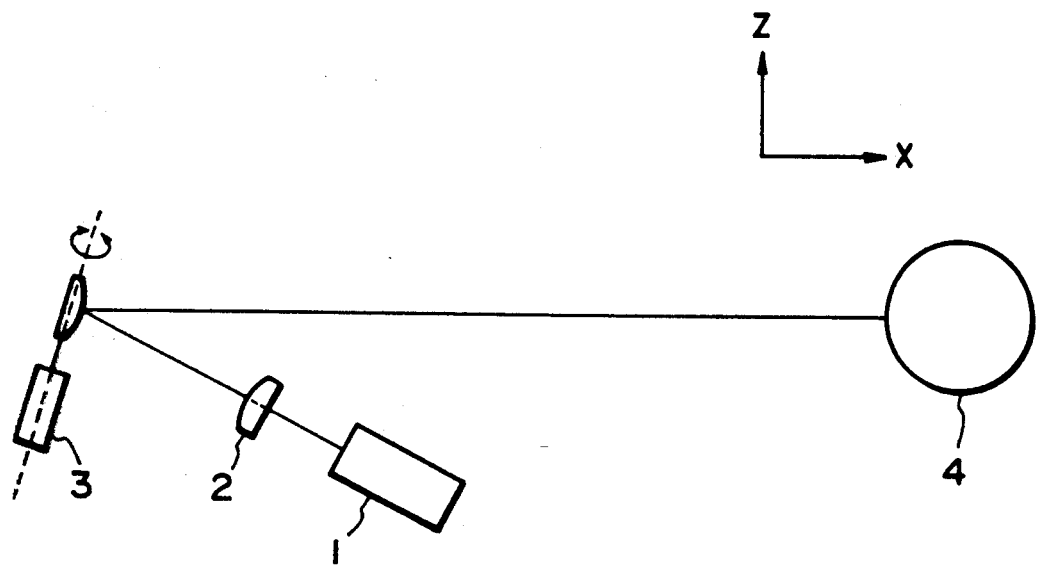
FIG. 5 is a view showing the apparatus shown in FIG. 4 when viewed from a subscanning direction.
Figure 6:
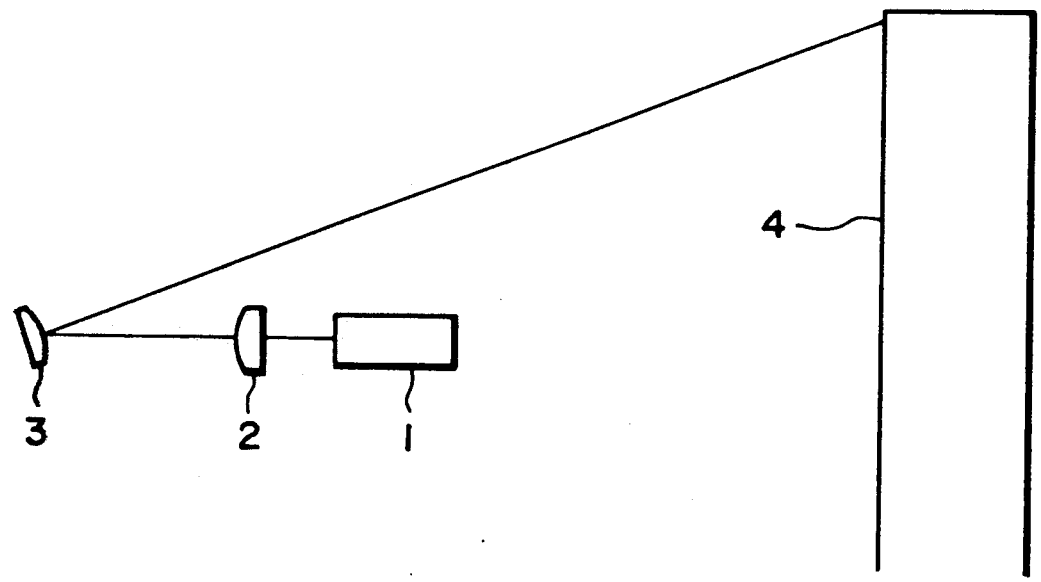
FIG. 6 is a view showing the apparatus shown in FIG. 4 when viewed from a main scanning direction.

FIG. 4 is a schematic view showing a scanning optical apparatus using a scanning optical system of the present invention, FIG. 5 is a view showing the apparatus of FIG. 4 when viewed from a subscanning surface (surface to be orthogonal to scanning direction), and FIG. 6 is a view showing the apparatus of FIG. 4 when viewed from a main scanning direction (scanning direction).

The scanning optical system shown in FIG. 4 includes a laser light source 1, an image formation lens 2, and a galvano mirror 3 serving as a sinusoidal oscillation mirror. The maximum deflection angle of the galvano mirror is set to be a value according to the present invention, and a mirror surface thereof has a curvature having a value associated with an object point distance of incident light according to the present invention. A photosensitive drum or the like is located at a surface 4 to be scanned. A light beam from the laser light source is converged by the image formation lens. The converged beam is incident on and reflected by the mirror surface of the galvano mirror, and forms an image on the surface to be scanned. An image formation point is scanned by the galvano mirror. In this case, since the mirror surface has the predetermined curvature, a deviation from the surface to be scanned falls within a predetermined allowance, and the surface to be scanned can be regarded as a plane.

According to the present invention, since the maximum deflection angle of the galvano mirror is determined without any electrical correction, evenness of a scanning speed on the surface to be scanned can be realized by the scanning optical system with a simple arrangement. According to the present invention, the mirror surface of the galvano mirror is a curved surface having a curvature in the main scanning direction, and a ratio of the radius of curvature of the mirror surface to a distance between the mirror surface and an object point of a ray incident on the mirror surface is determined, so that the surface to be scanned can be realized as a plane. A method of realizing the present invention will be described below.

A method of determining a maximum deflection angle of a galvano mirror for realizing evenness of a scanning speed will be explained below. For the sake of simplicity, a description will be made under an assumption that the pivotal center of the galvano mirror coincides with the mirror surface, and both light components incident on and emerging from the mirror surface are present within a main scanning plane (deflection plane). Note that the deflection plane is a light ray plane temporarily formed by a light beam deflected by the deflection/reflection surface (mirror surface) of the deflector and varying with time.

Figure 7:
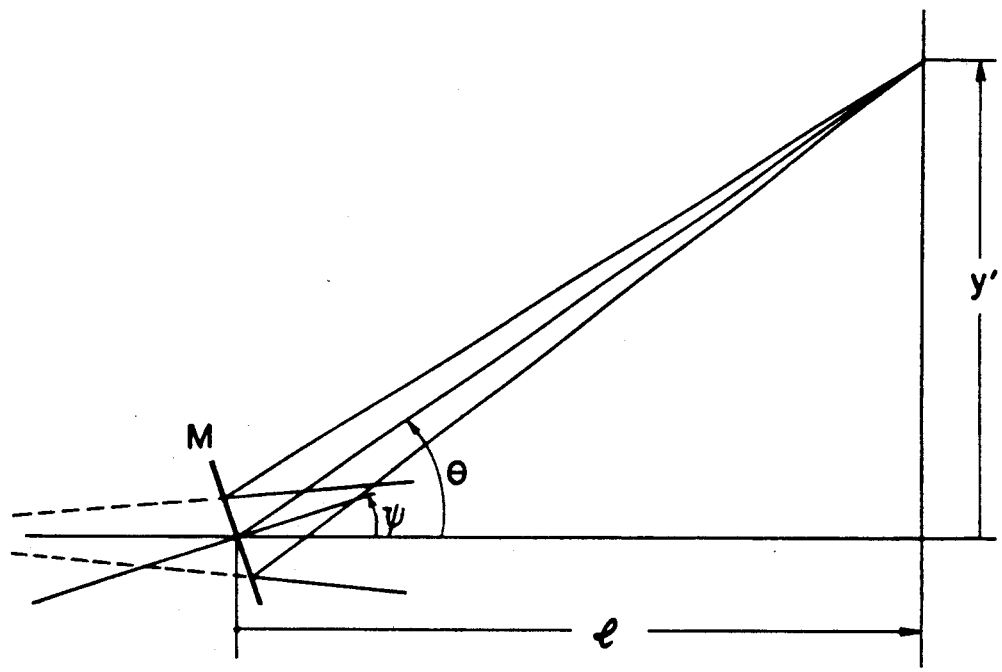
FIG. 7 is a view for explaining evenness of a scanning speed.

FIG. 7 shows a state of light rays in a main scanning plane (deflection plane of a mirror). A laser beam passing through an image formation lens (not shown) is reflected by a mirror surface M, and then forms an image. An image height of the light rays is represented by y'. In this case, an image formation point may or may not be offset from a surface to be scanned.

In a sinusoidally oscillating galvano mirror, a deflection angle $\psi$ of the mirror oscillates to have the following relationship between a maximum deflection angle $\psi_{max}$ (Peak-To-Peak Deg), an angular velocity $\omega$, and a time t:

$$\psi = \frac{\psi_{max}}{2} \sin\omega t$$

In this case, light rays incident from a direction $\psi=0$ are reflected in a direction of $\theta=2\psi$. The image height y' formed by the light rays on the surface to be scanned separated from the mirror surface by a distance l is expressed by:

$$y' = l\tan\theta = l\tan(\psi_{max}\sin\omega t)$$

On a portion where an angle is approximate to 0, this can be regarded as even speed scanning. However, practical dimensions of a scanning plane cannot be obtained. Thus, the above equations are developed to a cubic function of an angle as follows:

$$\psi = \frac{\psi_{max}}{2} \omega t - \frac{1}{6} \frac{\psi_{max}}{2} (\omega t)^3$$

$$y' = l\tan\left(\psi_{max}\omega t - \frac{1}{6}\psi_{max}(\omega t)^3\right)$$

$$= l\psi_{max}\omega t - \frac{l}{6}(\psi_{max} - 2\psi_{max}^3)(\omega t)^3$$

The second term represents an offset from an even scanning speed. Therefore, even speed scanning can be achieved when the following conditions are satisfied:

$$\psi_{max} - 2\psi_{max}^3 = 0$$
$$1 - 2\psi_{max}^2 = 0$$

$$\psi_{max} = \sqrt{\frac{1}{2}} = 0.707106 = \pm 40.514°$$

For $\psi_{max} > 0$

Contrary to this, when $\psi_{max}$ is selected as this value, even speed scanning can be realized within the range of an angle of degree 3. The above value $\psi_{max}$ can provide practical dimensions of the scanning surface. Taking into consideration an angle of still higher degrees, the value $\psi_{max}$ is influenced by the higher degrees. However, since this influence is small, when $\psi_{max}$ is selected to be approximate to the above-mentioned value, an offset from a value in even speed scanning can fall within a practical range. Based on this conclusion, simulation was made in consideration of an arrangement of an actual optical system. As a result, the range of the value $\psi_{max}$ with which an offset from a value in even speed scanning could fall within ±2% was 38° to 50°. When the value $\psi_{max}$ becomes smaller than 38°, the scanning speed of light rays tends to be decreased at a peripheral portion of the scanning surface. On the contrary, when the value $\psi_{max}$ exceeds 50°, the scanning speed of light rays tends to be increased at a peripheral portion of the scanning surface. Furthermore, simulation was made to obtain a better range. As a result, the range of the value $\psi_{max}$ with which an offset from a value in even speed scanning could fall within ±1% was 40° to 46°.

Figure 8:
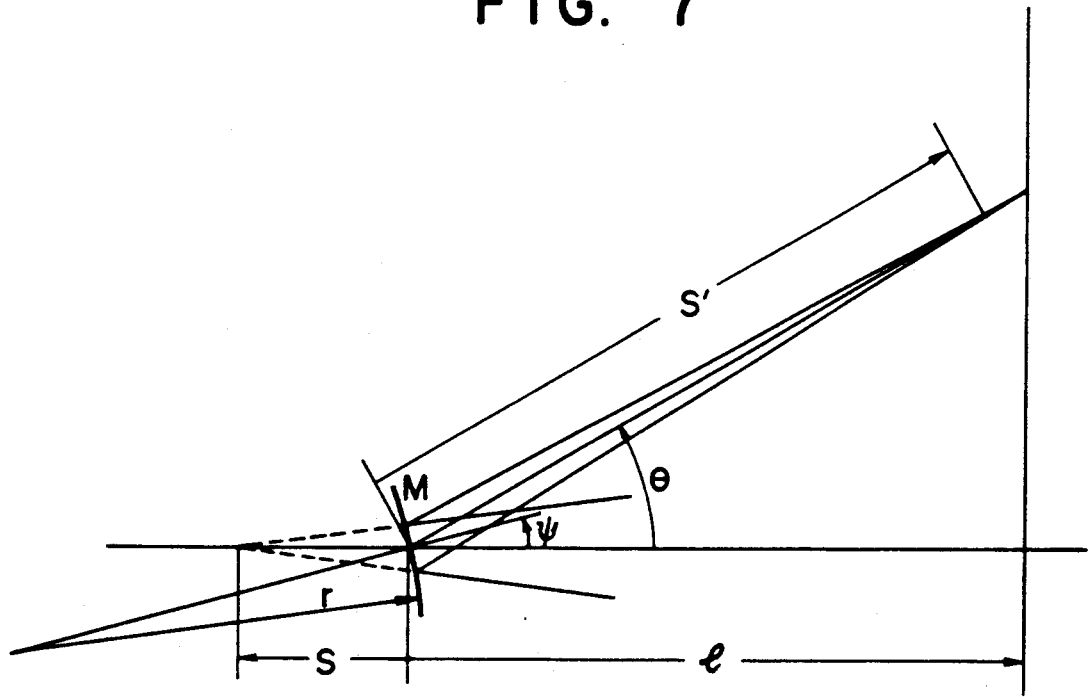
FIG. 8 is a view for explaining planeness of an image formation surface.

Next, a method of determining a ratio of a curvature of the mirror surface in the main scanning direction (within the deflection plane) to a distance between an object point of light rays (converged point of light beam without deflector) incident on the mirror surface and the mirror surface will be described below. FIG. 8 shows a state of light rays in the main scanning plane (deflection plane of the mirror). In FIG. 8, r indicates a radius of curvature of the mirror surface and is positive when the mirror surface is of a convex mirror. s is a distance from the mirror surface for reflecting a central ray of an incident light to an object point of the incident light, and is positive in an illustrated direction when the incident light is a converged light. When the deflection angle $\psi$ of the mirror is 0, the central rays of the beams incident on and reflected by the mirror surface are present within an identical plane. s' indicates a distance from the mirror surface reflecting the central ray of the incident beam to an image formation point. Since the mirror surface has a curvature, s and s' have different values. When the deflection angle $\psi$ of the mirror is 0, the image formation point is separated from the mirror surface by a distance l. The relationship between s and l is expressed by:

$$l = \frac{s \cdot r}{r - 2s}$$

The relationship between s and s' is expressed by:

$$s' = \frac{sr\cos\psi}{r\cos\psi - 2s}$$

An offset $\Delta$ from the plane of the surface to be scanned is given by:

$$\Delta = s'\cos\theta - l$$

Since $\theta=2\psi$, above equations can be summarized using the relationship $\cos 2\psi = 2\cos^2\psi - 1$ $$\Delta = \frac{sr(r - 2s)(2\cos^3\psi - \cos\psi) - r\cos\psi + 2s}{(r\cos\psi - 2s)(r - 2s)}$$

When $\Delta$ becomes 0 regardless of $\psi$, the surface to be scanned becomes a plane. Taking into consideration an angle of degree 3 or less, $$\cos\psi = 1 - \frac{1}{2}\psi^2, \cos^3\psi = 1 - \frac{3}{2}\psi^2$$

Thus, the relation in braces of the above equation can be rewritten as:

$$(r - 2s)\left(1 - \frac{5}{2}\psi^2\right) - r + \frac{r}{2}\psi^2 + 2s = (5s - 2r)\psi^2$$

Therefore, $\Delta$ becomes 0 regardless of $\psi$ within the range of an angle of degree 3 when the ratio of s to r is given by:

$$\frac{s}{r} = 0.4$$

Contrary to this, if s and r are selected to have the above relationship, the planeness of the surface to be scanned can be realized within the range of an angle of degree 3. Taking into consideration an angle of still higher degrees, the above-mentioned ratio is influenced by the higher degrees. However, since this influence is small, when the ratio is selected to be approximate to the above-mentioned value, an offset from the plane of the surface to be scanned can fall within a practical range. Based on this conclusion, simulation was made in consideration of an arrangement of an actual optical system. As a result, the range of the ratio of s to r with which an offset from the plane of the surface to be scanned could be a practical value was 0.35 to 0.45. Furthermore, simulation was made to obtain a better range. As a result, the range of the ratio of s to r with which an offset from the plane of the surface to be scanned could be small was 0.38 to 0.42.

In the embodiment of the present invention described above, the planeness of an image formation surface and evenness of a scanning speed required for a scanning optical apparatus can be realized by a minimum number of parts. FIGS. 9 to 12 show examples of unevenness of a scanning speed and a curve of an image formation surface calculated by changing conditions around the galvano mirror on the basis of the parts arrangement of this embodiment. In this case, the calculations were made under the assumption that the central rays of beams incident on and reflected by the mirror surface are present within an identical plane. The table below summarizes numerical values given in the respective examples.

Figure 9:
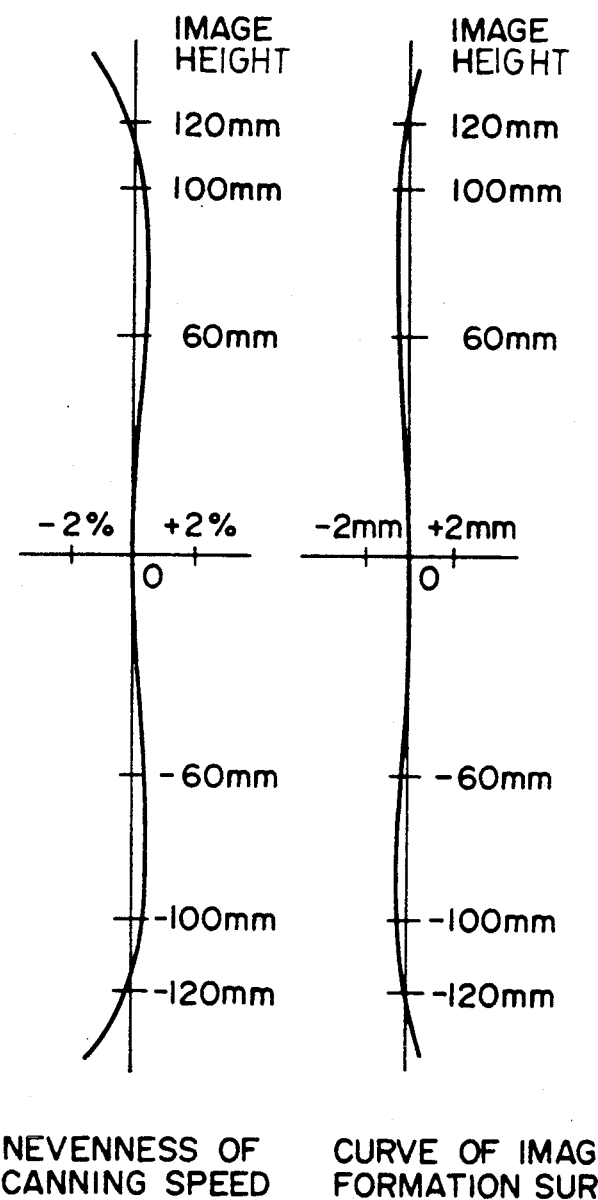
FIGS. 9; 10, 11, and 12 are views showing unevenness of a scanning speed and a curve of an image formation surface.
Figure 10:
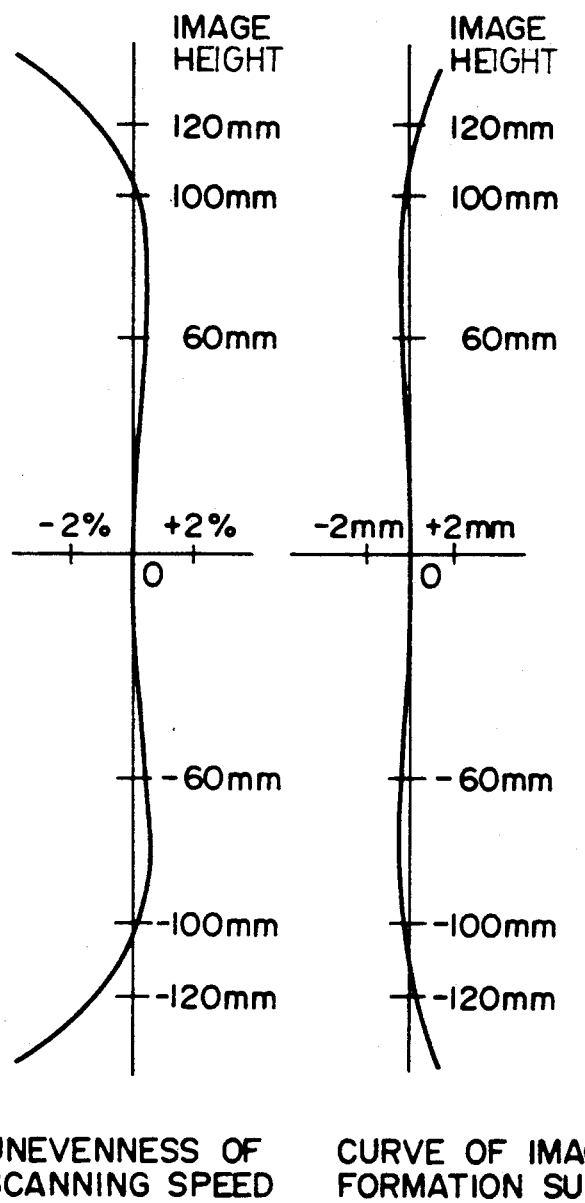
Figure 11:
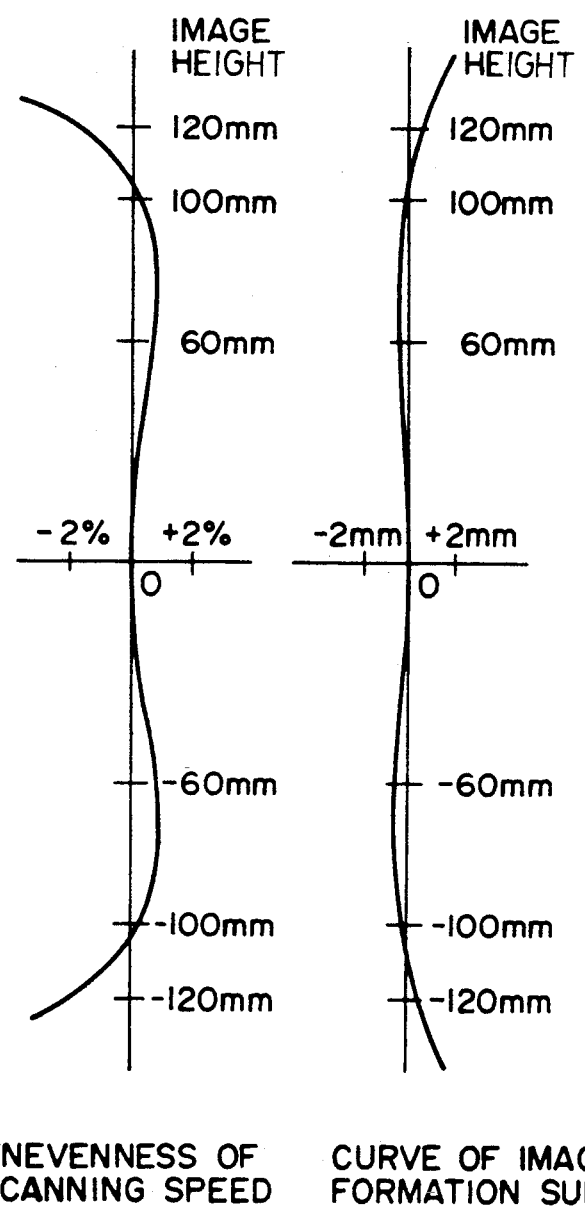
Figure 12:
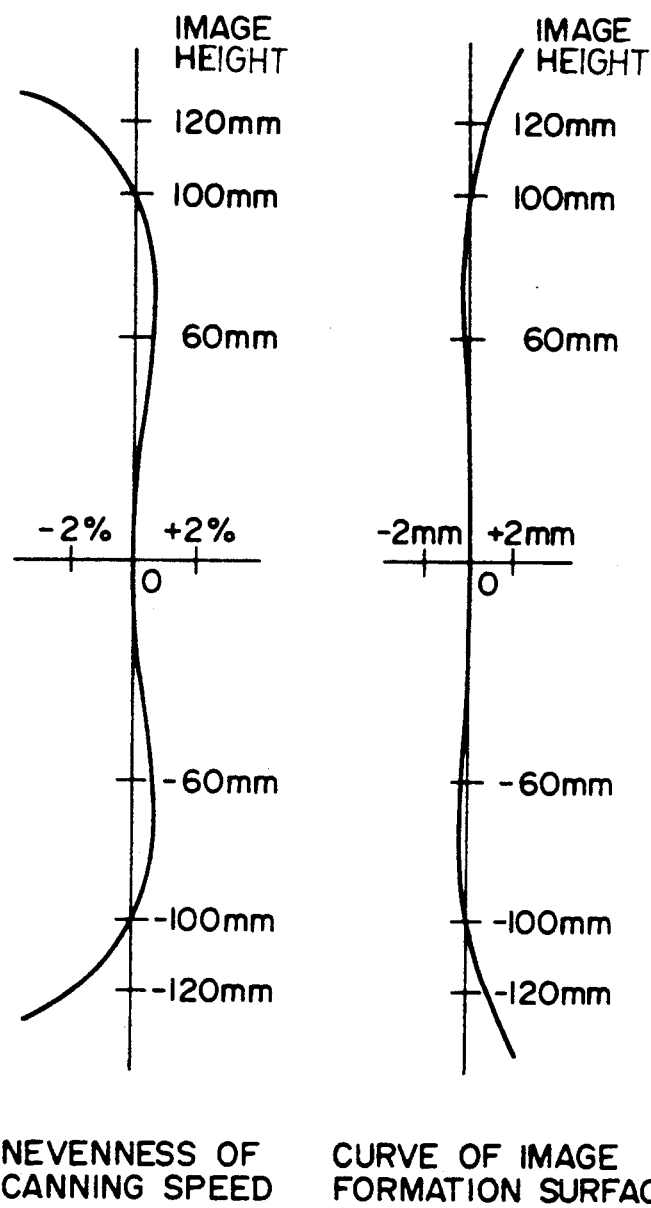

|  | Example a FIG. 9 | Example b FIG. 10 | Example c FIG. 11 | Example d FIG. 12 |
| --- | --- | --- | --- | --- |
| Radius of Curvature of Mirror Surface (mm) | 100 | 90 | 80 | 70 |
| Distance S between Incident Object Point and Mirror Surface (mm) | 39.5 | 35.4 | 31.2 | 28.4 |
| Maximum Deflection Angle $\psi_{max}$ (°) | 44.0 | 44.4 | 46.0 | 42.4 |
| Distance of Image Surface Center From Mirror Surface (mm) | 188.1 | 165.9 | 141.8 | 150.6 |
| Distance of Mirror Surface From Mirror Pivot Axis (mm) | 0 | 0.5 | 1.0 | −3.0 |

Figure 13A:
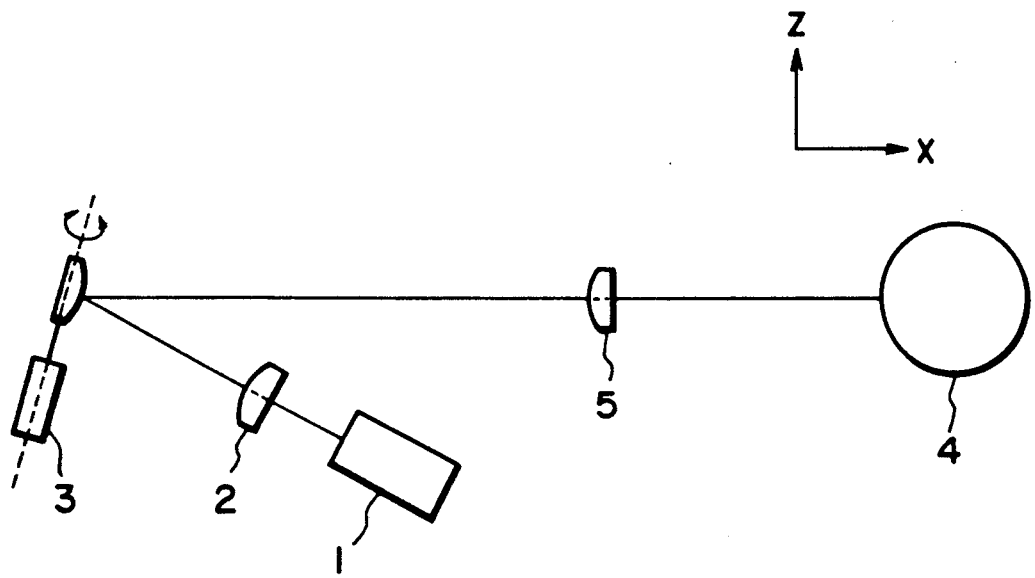
FIGS. 13A and 13B, FIGS. 14A and 14B, and FIG. 15 are schematic views showing other embodiments of the present invention.
Figure 13B:
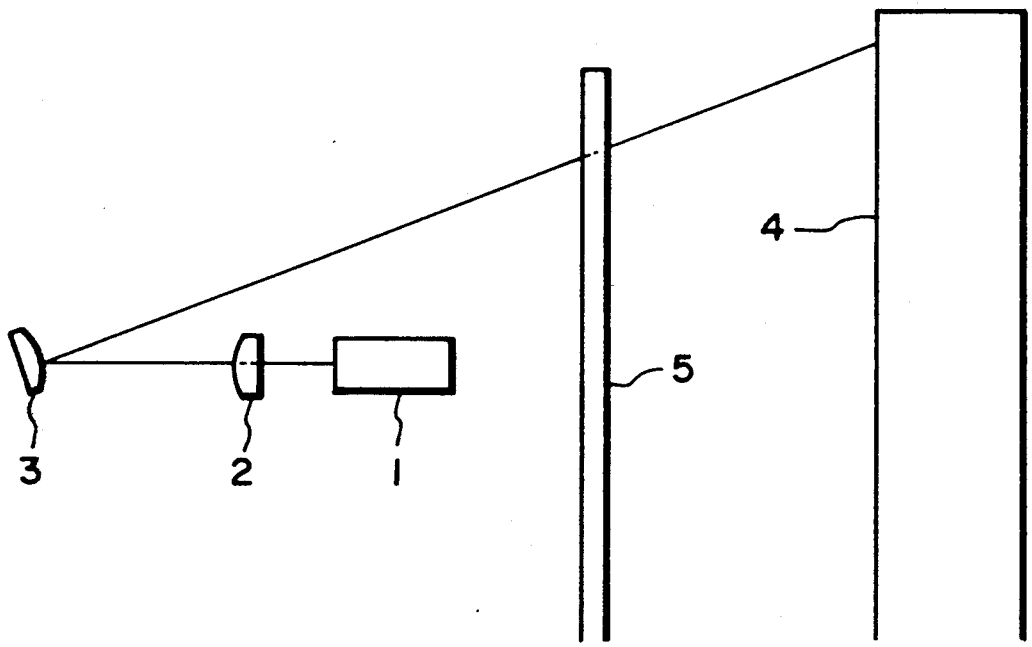

FIGS. 13A and 13B show another embodiment of the present invention. FIG. 13A is a view of this embodiment when viewed from the subscanning direction, and FIG. 13B is a view thereof when viewed from the main scanning direction. The same reference numerals in FIGS. 13A and 13B denote the same parts as in FIG. 4, and a detailed description thereof will be omitted. In this embodiment, a cylindrical lens 5 is inserted between a galvano mirror and a surface to be scanned to eliminate an influence caused by surface inclination of a mirror surface.

Figure 14A:
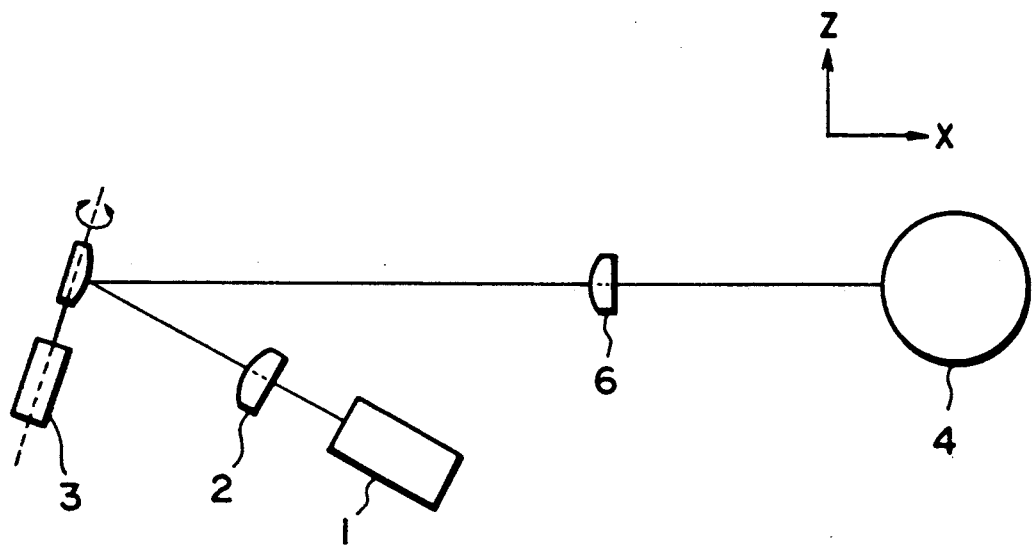
Figure 14B:
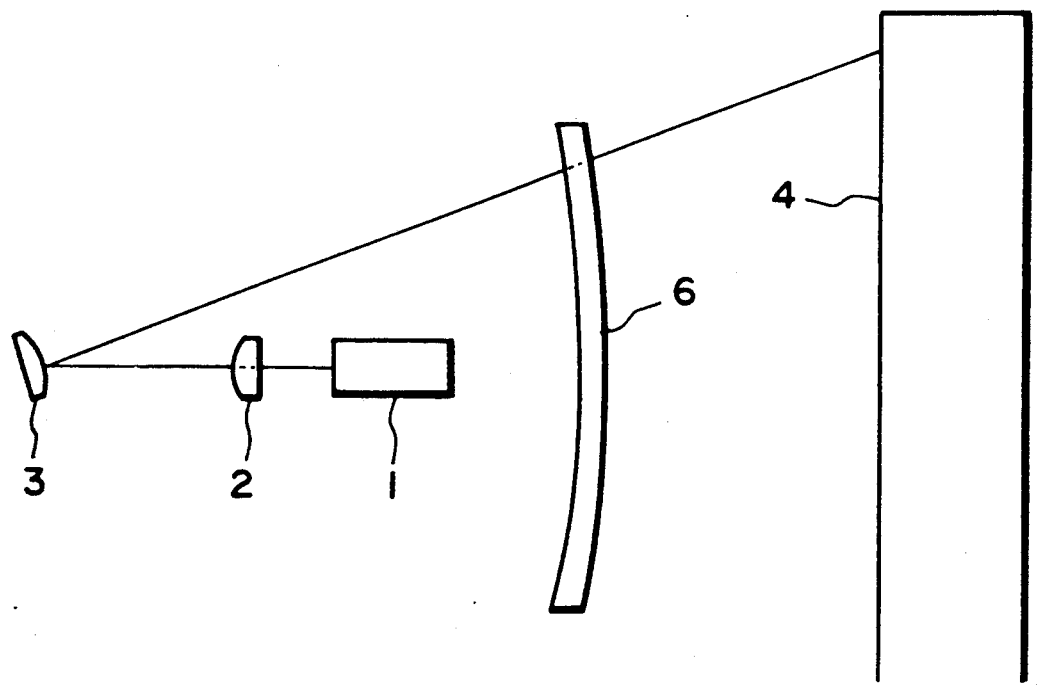

FIGS. 14A and 14B show still another embodiment of the present invention. FIG. 14A is a view of this embodiment when viewed from the subscanning direction, and FIG. 14B is a view thereof when viewed from the main scanning direction. The same reference numerals in FIGS. 14A and 14B denote the same parts as in FIG. 4, and a detailed description thereof will be omitted. In this embodiment, a toric lens 6 is inserted between a galvano mirror and a surface to be scanned to eliminate an influence caused by surface inclination of a mirror surface.

Figure 15:
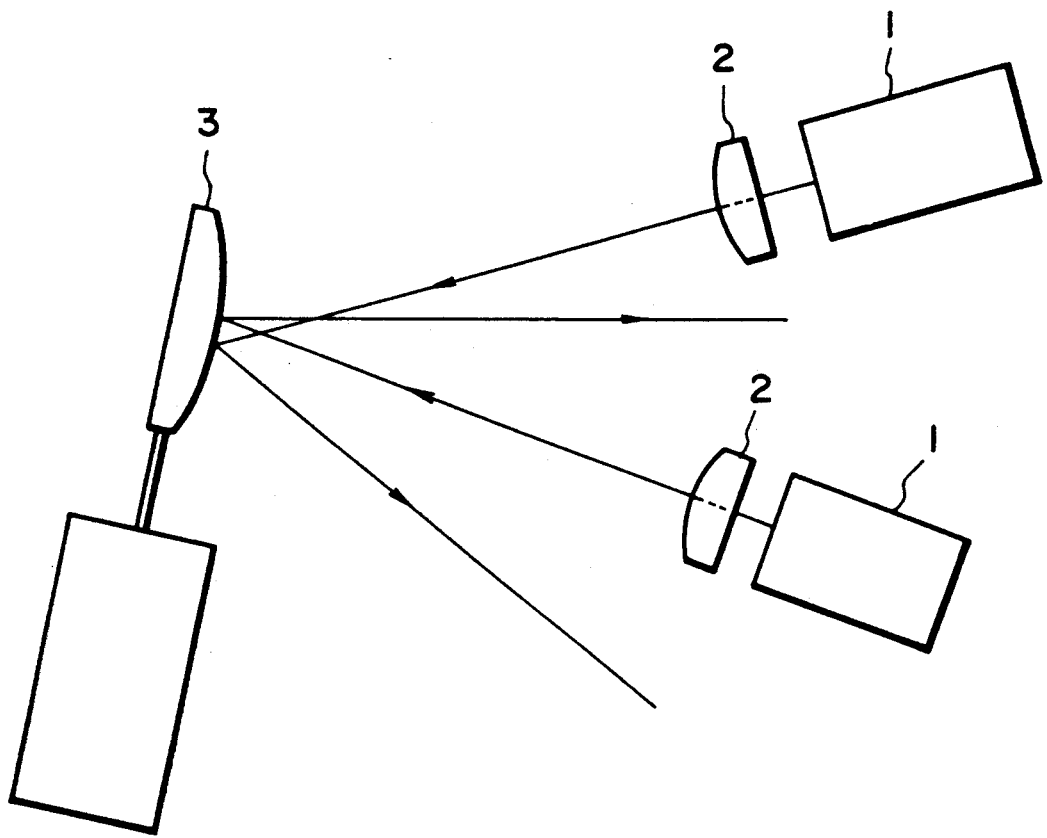

FIG. 15 shows still another embodiment of the present invention. Two laser beams are incident on a galvano mirror, and are scanned by a single galvano mirror. Since this system is of a post object type, the number of incident laser beams can be easily increased. The number of incident laser beams can be three or more.

As described above, according to the present invention, the maximum deflection angle of the galvano mirror is defined without performing any electrical correction, thereby realizing evenness of a scanning speed on a surface to be scanned with a simple scanning optical system. According to the present invention, the mirror surface of the galvano mirror is a curved surface having a radius of curvature in the scanning direction, and a ratio of the curvature of the mirror surface in the main scanning direction to a distance to an object point of light rays incident on the mirror surface is defined, thereby realizing planeness of the surface to be scanned.

In the above embodiments described above, a light beam is incident on the galvano mirror from a z-x plane (a plane including a pivot axis of the galvano mirror and perpendicular to a deflection plane). This arrangement is necessary to keep symmetricity of reflected light of the light beam particularly when the mirror surface is a curved surface.

Scanning optical systems using deflectors will be described below with reference to FIGS. 16 to 25.

In these embodiments, the pivot axis and the mirror surface of the deflector are inclined so that a curve of an image surface of a light beam falls within an allowable range from a plane, and the pivot axis of the deflector is inclined with respect to a normal (z direction) of the deflection plane, so that a curve of the image surface of the light beam falls within the allowable range from a plane. In this case, the scanning surface is parallel to the z-axis.

This will be explained in detail below with reference to the drawings.

Figure 16:
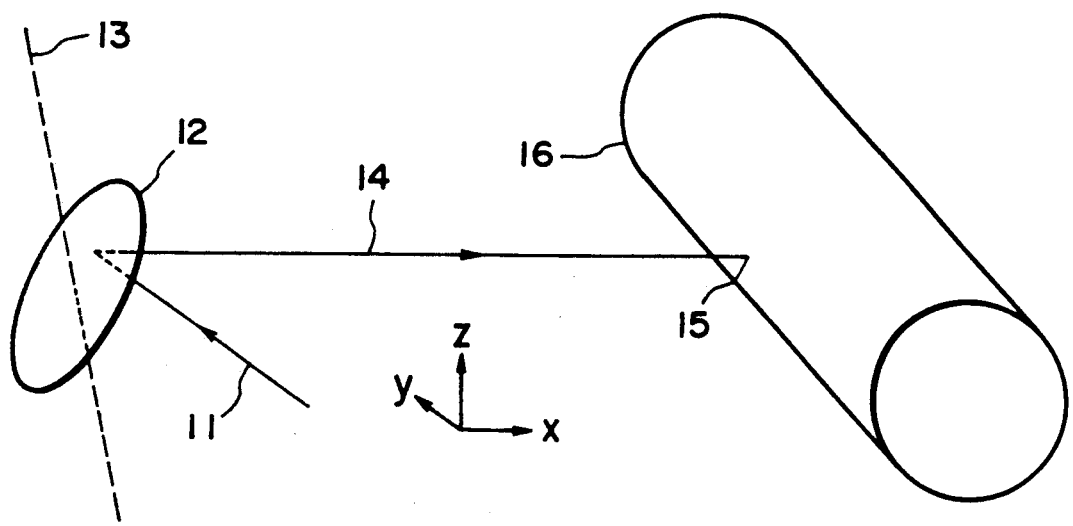
FIG. 16 is a perspective view showing the principle of the present invention.
Figure 17:
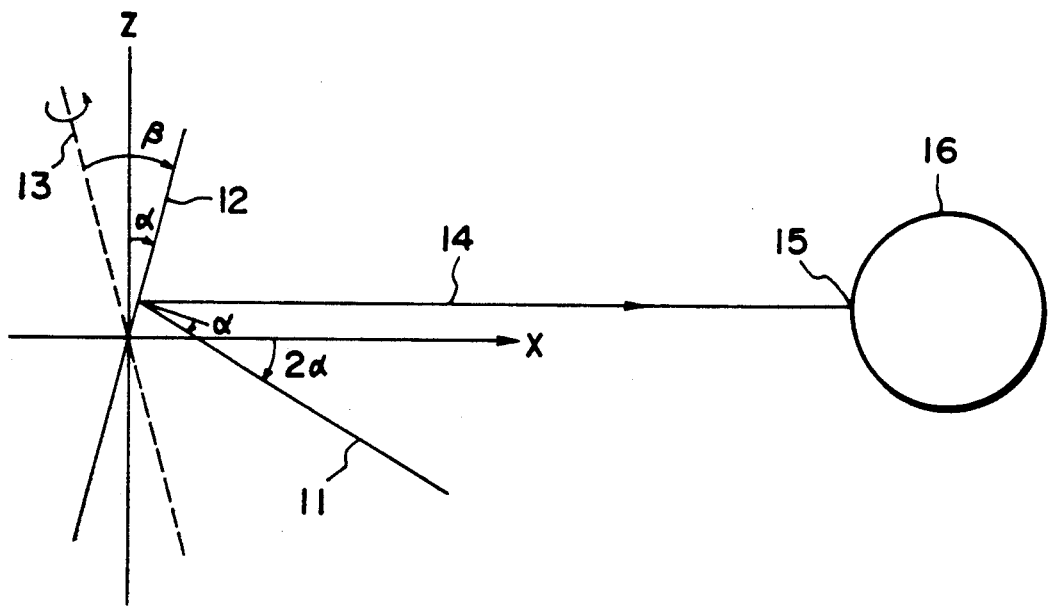
FIG. 17 is a sectional view showing the principle of the present invention.

FIG. 16 shows the overall arrangement for explaining the principle of the present invention. As shown in FIG. 16, an x-y-z orthogonal coordinate system is provided. FIG. 17 is a sectional view taken along a z-x plane in FIG. 16, and illustrates a state wherein the scanning angle (pivot angle) of a mirror is 0. That is, light beams incident on and emerging from the mirror are present within an identical plane. In FIG. 16, a light beam emitted from a light source is incident as an incident beam 11 at an incident angle $\alpha$ on a mirror surface 12 of a deflector through a collimator lens (not shown), is reflected by the mirror surface, and forms an image on a surface to be scanned. The light beam may pass through a lens system (not shown) used as needed between the light source and the surface to be scanned. The mirror surface 12 of the deflector is fixed to a pivot axis 13 of the deflector, and is pivoted about the pivot axis, thereby scanning a reflected beam 14 on the surface to be scanned. A photosensitive drum 16 for performing recording is placed at the surface 15 to be scanned. An angle defined between the pivot axis and the mirror surface will be described below with reference to FIG. 17. The incident beam is incident to define an angle $2\alpha$ with the x axis. On the other hand, the mirror surface is fixed to define an angle $\beta$ (not 0) with the pivot axis. When the scanning angle is 0, the mirror surface forms an angle $\alpha$ with the z axis. Therefore, the reflected beam is parallel to the x axis. If $\beta$ is 0, the relationship between a direction vector of the incident beam and the normal vector of the mirror surface is changed as the mirror is pivoted, and a z component is generated in the direction vector of the reflected beam. When the pivot center of the mirror is different from the position of the mirror surface of the incident beam, an incident position is offset in the z direction, and an image formation position is changed.

In the present invention, since the mirror surface and the pivot axis form the angle $\beta \neq 0$, a curve of an image formation surface in the z direction caused when the mirror is pivoted can fall within an allowable range. Light rays reflected by the mirror surface before they reach the surface to be scanned can fall within a range regarded as a plane.

It was found that the value $\beta$ took different values depending on an angle of the incident beam, a incident beam position, a curvature of the mirror surface, and a radius of pivotal movement of the mirror surface (a distance between the incident position of light rays onto the mirror surface when the scanning angle is 0° and the pivot axis).

Tests were made by changing these conditions. It was found that $\beta$ causing a curve of the image formation surface in the z direction to fall within the allowable range had the relationship of $0.5 \times 2\alpha < \beta < 1.2 \times 2\alpha$ with $2\alpha$.

Tables 1 to 22 below show values 8 according to the present invention for some incident beam directions, positions of an image surface in the z direction at some scanning angles at corresponding 8, and positions of the image surface in the z direction according to comparative examples.

In each table, $2\alpha$ means an angle formed by an incident light with the x axis, $\beta$ is the angle formed by the pivot axis and the mirror surface of the deflector according to the present invention, and $\theta$ is the pivot angle of the mirror. In this case, the angle $\theta$ represents an angle of pivotal movement of the mirror surface pivoted about the pivot axis of the deflector. When $\theta = 0°$, a laser beam is reflected within the z-x plane. An image position is separated from the pivot center of the mirror by 200 mm, and a position in the z direction (an offset from an ideal scanning line) is shown in units of mm. No lens system is inserted between the mirror surface and the image surface.

Tables 1 to 4 show cases wherein the mirror surface is a plane, and the radius of pivotal movement of the mirror is 0.

Tables 5 to 8 show cases wherein the mirror surface is of a flat mirror, and a radius a of pivotal movement of the mirror is changed.

Tables 9 to 22 show cases wherein the mirror surface has a radius of curvature 4 and is one of a spherical mirror and a cylindrical mirror, and the radius a of pivotal movement of the mirror is changed. In the case of the cylindrical mirror, the generatrix of the cylindrical surface corresponds to the perpendicular of the mirror.

TABLE 1

| | $2\alpha = 5°$ | |
|---|---|---|
| $\theta$ | Present Invention $\beta = 5.137°$ | Comparative Example $\beta = 0°$ |
| 0° | 0.000 | 0.000 |
| 5° | −0.004 | 0.134 |
| 10° | −0.013 | 0.559 |
| 15° | −0.019 | 1.348 |
| 20° | 0.000 | 2.660 |

TABLE 2

| | $2\alpha = 10°$ | |
|---|---|---|
| $\theta$ | Present Invention $\beta = 10.141°$ | Comparative Example $\beta = 0°$ |
| 0° | 0.000 | 0.000 |
| 5° | −0.007 | 0.268 |
| 10° | −0.024 | 1.114 |
| 15° | −0.034 | 2.683 |
| 20° | 0.000 | 5.291 |

TABLE 3

| | $2\alpha = 15°$ | |
|---|---|---|
| $\theta$ | Present Invention $\beta = 14.896°$ | Comparative Example $\beta = 0°$ |
| 0° | 0.000 | 0.000 |
| 5° | −0.010 | 0.399 |
| 10° | −0.032 | 1.659 |
| 15° | −0.045 | 3.993 |
| 20° | 0.000 | 7.864 |

TABLE 4

| | $2\alpha = 20°$ | |
|---|---|---|
| $\theta$ | Present Invention $\beta = 19.317°$ | Comparative Example $\beta = 0°$ |
| 0° | 0.000 | 0.000 |
| 5° | −0.011 | 0.527 |
| 10° | −0.036 | 2.191 |
| 15° | −0.051 | 5.267 |
| 20° | 0.000 | 10.350 |

TABLE 5 a = 0.5 mm

| | 2α = 5° | | 2α = 10° | |
|---|---|---|---|---|
| | Present Invention | Comparative Example | Present Invention | Comparative Example |
| | β | | | |
| θ | 5.130° | 0° | 9.296° | 0° |
| 0° | 0.000 | 0.000 | 0.000 | 0.000 |
| 5° | −0.007 | 0.267 | −0.011 | 0.525 |
| 10° | −0.024 | 1.110 | −0.036 | 2.182 |
| 15° | −0.034 | 2.673 | −0.051 | 5.247 |
| 20° | 0.000 | 5.271 | 0.000 | 10.311 |

TABLE 6 a = 10 mm

| | 2α = 5° | | 2α = 10° | |
|---|---|---|---|---|
| | Present Invention | Comparative Example | Present Invention | Comparative Example |
| | β | | | |
| θ | 4.915° | 0° | 8.882° | 0° |
| 0° | 0.000 | 0.000 | 0.000 | 0.000 |
| 5° | −0.008 | 0.248 | −0.012 | 0.487 |
| 10° | −0.026 | 1.030 | −0.039 | 2.024 |
| 15° | −0.036 | 2.482 | −0.055 | 4.868 |
| 20° | 0.000 | 4.897 | 0.000 | 9.570 |

TABLE 7 a = 15 mm

| | 2α = 5° | | 2α = 10° | |
|---|---|---|---|---|
| | Present Invention | Comparative Example | Present Invention | Comparative Example |
| | β | | | |
| θ | 4.792° | 0° | 8.647° | 0° |
| 0° | 0.000 | 0.000 | 0.000 | 0.000 |
| 5° | −0.008 | 0.238 | −0.012 | 0.467 |
| 10° | −0.026 | 0.988 | −0.041 | 1.941 |
| 15° | −0.037 | 2.382 | −0.057 | 4.668 |
| 20° | 0.000 | 4.700 | 0.000 | 9.180 |

TABLE 8 a = 20 mm

| | 2α = 5° | | 2α = 10° | |
|---|---|---|---|---|
| | Present Invention | Comparative Example | Present Invention | Comparative Example |
| | β | | | |
| θ | 4.662° | 0° | 8.397° | 0° |
| 0° | 0.000 | 0.000 | 0.000 | 0.000 |
| 5° | −0.008 | 0.228 | −0.013 | 0.447 |
| 10° | −0.027 | 0.947 | −0.042 | 1.858 |
| 15° | −0.038 | 2.282 | −0.039 | 4.469 |
| 20° | 0.000 | 4.503 | 0.000 | 8.790 |

TABLE 9 r = 100 mm    a = 0.5 mm    2α = 10°

| | Spherical Mirror | | Cylindrical Mirror | |
|---|---|---|---|---|
| | Present Invention | Comparative Example | Present Invention | Comparative Example |
| | β | | | |
| θ | 10.048° | 0° | 10.127° | 0° |
| 0° | 0.000 | 0.000 | 0.000 | 0.000 |
| 5° | −0.007 | 0.263 | −0.007 | 0.264 |
| 10° | −0.024 | 1.095 | −0.024 | 1.098 |
| 15° | −0.033 | 2.636 | −0.034 | 2.642 |
| 20° | 0.000 | 5.190 | 0.000 | 5.203 |

TABLE 10 r = 100 mm    a = 0.5 mm    2α = 20°

| | Spherical Mirror | | Cylindrical Mirror | |
|---|---|---|---|---|
| | Present Invention | Comparative Example | Present Invention | Comparative Example |
| | β | | | |
| θ | 19.145° | 0° | 19.292° | 0° |
| 0° | 0.000 | 0.000 | 0.000 | 0.000 |
| 5° | −0.011 | 0.519 | −0.011 | 0.520 |
| 10° | −0.035 | 2.154 | −0.036 | 2.159 |
| 15° | −0.049 | 5.174 | −0.050 | 5.186 |
| 20° | 0.000 | 10.154 | 0.000 | 10.179 |

TABLE 11 r = 100 mm    a = 10 mm    2α = 10°

| | Spherical Mirror | | Cylindrical Mirror | |
|---|---|---|---|---|
| | Present Invention | Comparative Example | Present Invention | Comparative Example |
| | β | | | |
| θ | 8.278 | 0° | 9.955° | 0° |
| 0° | 0.000 | 0.000 | 0.000 | 0.000 |
| 5° | −0.003 | 0.188 | −0.005 | 0.199 |
| 10° | −0.011 | 0.775 | −0.017 | 0.822 |
| 15° | −0.015 | 1.836 | −0.024 | 1.948 |
| 20° | 0.000 | 3.522 | 0.000 | 3.738 |

TABLE 12 r = 100 mm    a = 10 mm    2α = 20°

| | Spherical Mirror | | Cylindrical Mirror | |
|---|---|---|---|---|
| | Present Invention | Comparative Example | Present Invention | Comparative Example |
| | β | | | |
| θ | 15.833° | 0° | 18.983° | 0° |
| 0° | 0.000 | 0.000 | 0.000 | 0.000 |
| 5° | −0.005 | 0.371 | −0.008 | 0.392 |
| 10° | −0.017 | 1.529 | −0.026 | 1.616 |
| 15° | −0.024 | 3.615 | −0.035 | 3.822 |
| 20° | 0.000 | 6.918 | 0.000 | 7.317 |

TABLE 13 r = 80 mm    a = 15 mm    2α = 10°

| | Spherical Mirror | | Cylindrical Mirror | |
|---|---|---|---|---|
| | Present Invention | Comparative Example | Present Invention | Comparative Example |
| | β | | | |
| θ | 6.746° | 0° | 10.168° | 0° |
| 0° | 0.000 | 0.000 | 0.000 | 0.000 |
| 5° | −0.001 | 0.136 | −0.004 | 0.155 |
| 10° | −0.004 | 0.556 | −0.013 | 0.632 |
| 15° | −0.005 | 1.299 | −0.018 | 1.479 |
| 20° | 0.000 | 2.440 | 0.000 | 2.783 |

TABLE 14 r = 80 mm    a = 15 mm    2α = 20°

| | Spherical Mirror | | Cylindrical Mirror | |
|---|---|---|---|---|
| | Present Invention | Comparative Example | Present Invention | Comparative Example |
| | β | | | |
| θ | 12.928° | 0° | 19.435° | 0° |
| 0° | 0.000 | 0.000 | 0.000 | 0.000 |
| 5° | −0.002 | 0.269 | −0.006 | 0.304 |
| 10° | −0.005 | 1.099 | −0.019 | 1.242 |
| 15° | −0.007 | 2.565 | −0.026 | 2.902 |
| 20° | 0.000 | 4.810 | 0.000 | 5.450 |

TABLE 15

| | r = 100 mm | a = 15 mm | 2α = 10° | |
|---|---|---|---|---|
| | Spherical Mirror | | Cylindrical Mirror | |
| | Present Invention | Comparative Example | Present Invention | Comparative Example |
| | | β | | |
| θ | 7.345° | 0° | 9.960° | 0° |
| 0° | 0.000 | 0.000 | 0.000 | 0.000 |
| 5° | −0.002 | 0.154 | −0.004 | 0.170 |
| 10° | −0.007 | 0.632 | −0.015 | 0.696 |
| 15° | −0.009 | 1.486 | −0.020 | 1.638 |
| 20° | 0.000 | 2.815 | 0.000 | 3.107 |

TABLE 16

| | r = 100 mm | a = 15 mm | 2α = 20° | |
|---|---|---|---|---|
| | Spherical Mirror | | Cylindrical Mirror | |
| | Present Invention | Comparative Example | Present Invention | Comparative Example |
| | | β | | |
| θ | 14.065° | 0° | 19.009° | 0° |
| 0° | 0.000 | 0.000 | 0.000 | 0.000 |
| 5° | −0.003 | 0.305 | −0.007 | 0.334 |
| 10° | −0.010 | 1.248 | −0.022 | 1.368 |
| 15° | −0.014 | 2.930 | −0.030 | 3.213 |
| 20° | 0.000 | 5.541 | 0.000 | 6.081 |

TABLE 17

| | r = 150 mm | a = 15 mm | 2α = 10° | |
|---|---|---|---|---|
| | Spherical Mirror | | Cylindrical Mirror | |
| | Present Invention | Comparative Example | Present Invention | Comparative Example |
| | | β | | |
| θ | 8.151° | 0° | 9.811° | 0° |
| 0° | 0.000 | 0.000 | 0.000 | 0.000 |
| 5° | −0.004 | 0.180 | −0.005 | 0.191 |
| 10° | −0.012 | 0.742 | −0.017 | 0.787 |
| 15° | −0.016 | 1.757 | −0.024 | 1.865 |
| 20° | 0.000 | 3.371 | 0.000 | 3.581 |

TABLE 18

| | r = 150 mm | a = 15 mm | 2α = 20° | |
|---|---|---|---|---|
| | Spherical Mirror | | Cylindrical Mirror | |
| | Present Invention | Comparative Example | Present Invention | Comparative Example |
| | | β | | |
| θ | 15.589° | 0° | 18.705° | 0° |
| 0° | 0.000 | 0.000 | 0.000 | 0.000 |
| 5° | −0.006 | 0.355 | −0.008 | 0.376 |
| 10° | −0.019 | 1.463 | −0.027 | 1.546 |
| 15° | −0.026 | 3.459 | −0.037 | 3.658 |
| 20° | 0.000 | 6.622 | 0.000 | 7.006 |

TABLE 19

| | r = 100 mm | a = 20 mm | 2α = 10° | |
|---|---|---|---|---|
| | Spherical Mirror | | Cylindrical Mirror | |
| | Present Invention | Comparative Example | Present Invention | Comparative Example |
| | | β | | |
| θ | 6.409° | 0° | 10.074° | 0° |
| 0° | 0.000 | 0.000 | 0.000 | 0.000 |
| 5° | −0.001 | 0.124 | −0.004 | 0.143 |
| 10° | −0.003 | 0.506 | −0.013 | 0.583 |
| 15° | −0.004 | 1.179 | −0.017 | 1.362 |
| 20° | 0.000 | 2.208 | 0.000 | 2.556 |

TABLE 20

| | r = 100 mm | a = 20 mm | 2α = 20° | |
|---|---|---|---|---|
| | Spherical Mirror | | Cylindrical Mirror | |
| | Present Invention | Comparative Example | Present Invention | Comparative Example |
| | | β | | |
| θ | 12.284° | 0° | 19.259° | 0° |
| 0° | 0.000 | 0.000 | 0.000 | 0.000 |
| 5° | −0.001 | 0.245 | −0.006 | 0.280 |
| 10° | −0.005 | 1.000 | −0.019 | 1.145 |
| 15° | −0.006 | 2.329 | −0.026 | 2.671 |
| 20° | 0.000 | 4.356 | 0.000 | 5.004 |

TABLE 21

| | r = 100 mm | a = 25 mm | 2α = 10° | |
|---|---|---|---|---|
| | Spherical Mirror | | Cylindrical Mirror | |
| | Present Invention | Comparative Example | Present Invention | Comparative Example |
| | | β | | |
| θ | 5.472° | 0° | 10.371° | 0° |
| 0° | 0.000 | 0.000 | 0.000 | 0.000 |
| 5° | 0.000 | 0.097 | −0.003 | 0.118 |
| 10° | −0.001 | 0.394 | −0.011 | 0.482 |
| 15° | −0.001 | 0.912 | −0.015 | 1.118 |
| 20° | 0.000 | 1.690 | 0.000 | 2.078 |

TABLE 22

| | r = 100 mm | a = 25 mm | 2α = 20° | |
|---|---|---|---|---|
| | Spherical Mirror | | Cylindrical Mirror | |
| | Present Invention | Comparative Example | Present Invention | Comparative Example |
| | | β | | |
| θ | 10.490° | 0° | 19.900° | 0° |
| 0° | 0.000 | 0.000 | 0.000 | 0.000 |
| 5° | 0.000 | 0.192 | −0.005 | 0.232 |
| 10° | 0.000 | 0.780 | −0.016 | 0.946 |
| 15° | 0.000 | 1.805 | −0.022 | 2.192 |
| 20° | 0.000 | 3.341 | 0.000 | 4.067 |

On the basis of the above-mentioned embodiments, the relationship between $\beta$ and $2\alpha$ causing a curve of an image surface in the z direction to satisfactorily fall within an allowable range was examined. As a result, the following condition is preferably used:

$$0.8 \times 2\alpha < \beta < 1.1 \times 2\alpha$$

When the mirror surface is a flat surface, the following condition is preferably used:

$$0.8 \times 2\alpha < \beta < 1.1 \times 2\alpha$$

When the mirror surface is a spherical surface, the following condition is preferably used:

$$0.5 \times 2\alpha < \beta < 1.1 \times 2\alpha$$

When the mirror surface is a cylindrical surface, the following condition is preferably used:

$$0.9 \times 2\alpha < \beta < 1.1 \times 2\alpha$$

In the above embodiments, since a light beam is incident on the deflector from a z-x plane (a plane including a pivot axis of the deflector and perpendicular to the deflection plane), the reflected rays of the light beam can be symmetrical. That is, the reflected rays from the deflector can be regarded to be symmetrical within a single plane.

Figure 18:
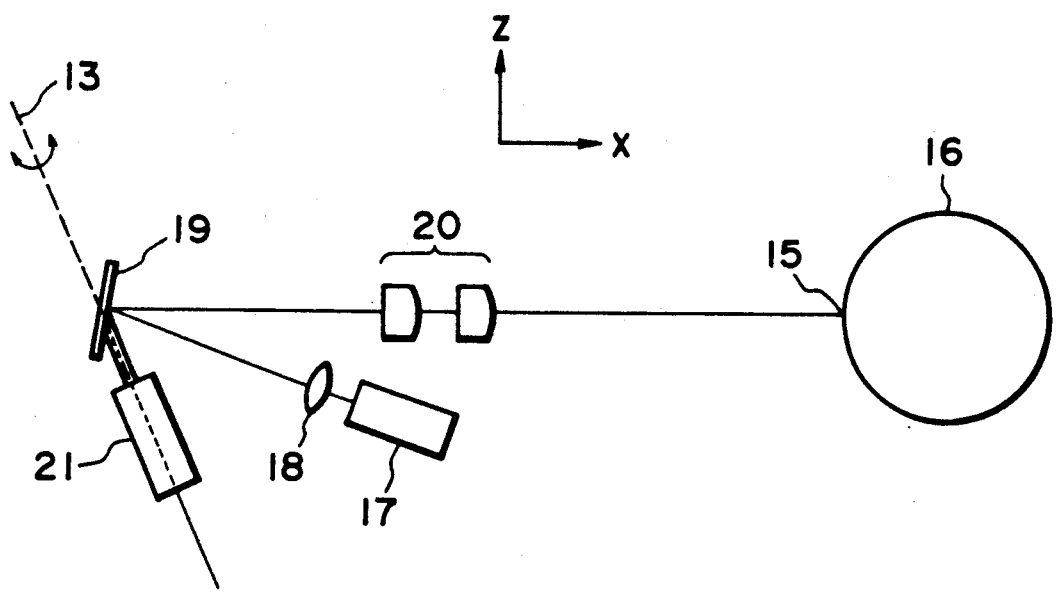
FIGS. 18 to 25 are views showing other embodiments of the present invention.
Figure 19:
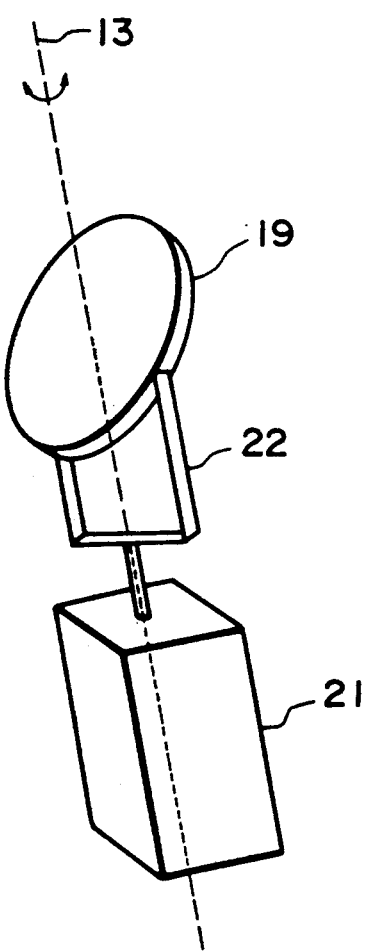

FIG. 18 shows still another embodiment of the present invention, which utilizes a galvano mirror as a deflector. FIG. 19 shows only the galvano mirror shown in FIG. 18. In FIG. 19, since a mirror 19 of the galvano mirror is inclined at an angle according to the present invention with respect to a pivot axis 13, it is fixed to the pivot axis 13 by a fork-like support member 22 shown in FIG. 19. The mirror 19 sinusoidally oscillates around the pivot axis 13 by a driver 21.

A light beam emitted from a light source 17 is collimated into a parallel beam by a collimator lens 18, and is then incident on the mirror 19 of the galvano mirror. The beam is then reflected by the mirror surface, and forms an image on a surface to be scanned through an arcsin$\theta$ lens 20.

Figure 1:
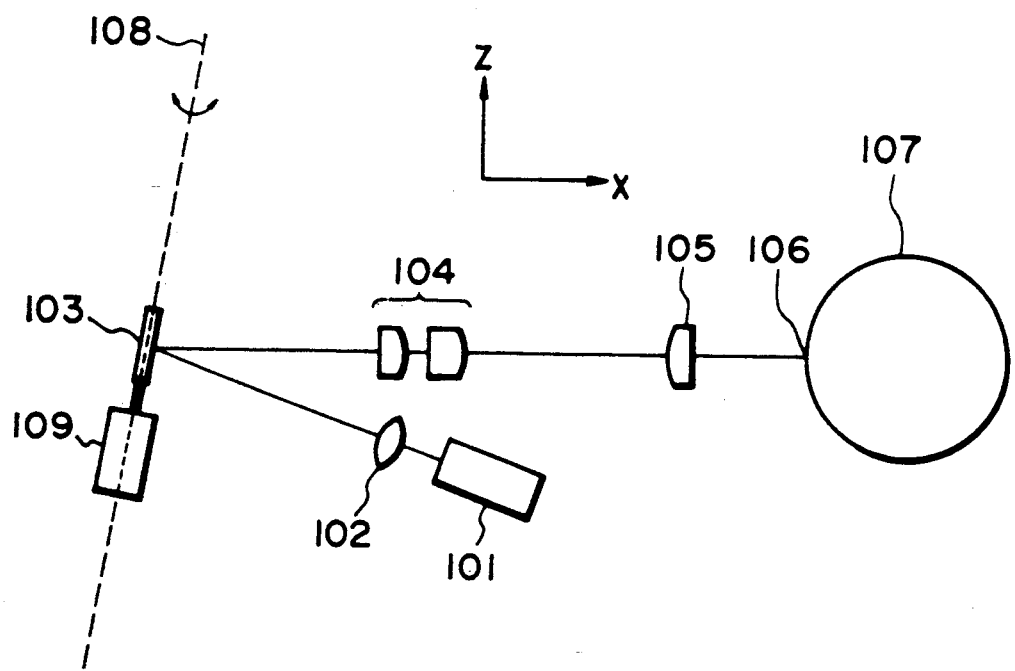
FIGS. 1 to 3 are schematic views showing arrangements of conventional scanning optical apparatuses, respectively.

Unlike in the above embodiment (FIG. 1), a curve of the image surface in the z direction can be reduced or eliminated in this embodiment. Therefore, no cylindrical lens for correcting this is necessary.

Figure 2:
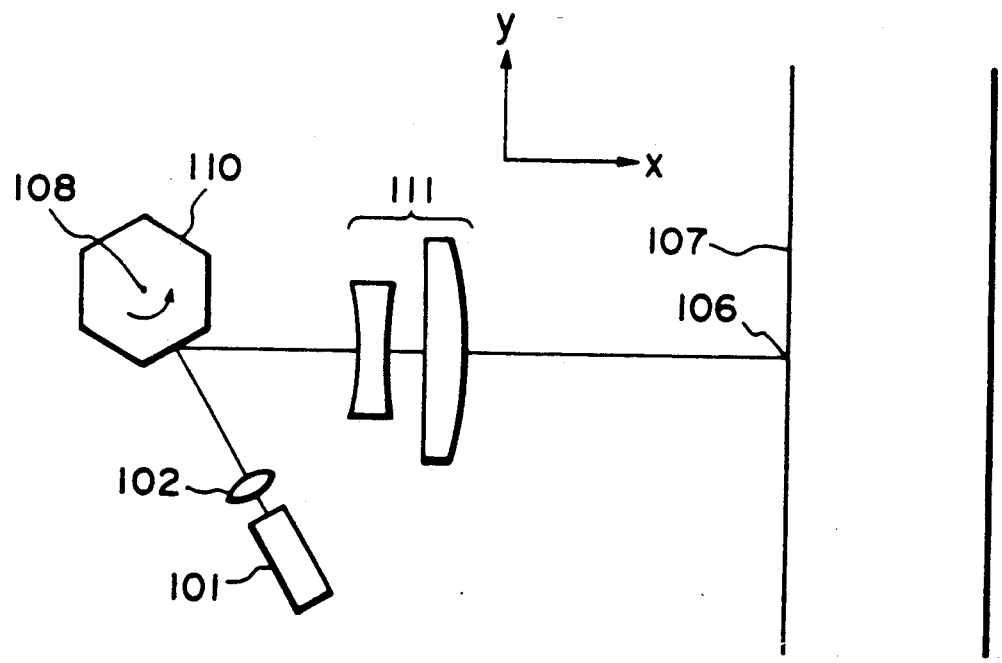
Figure 3:
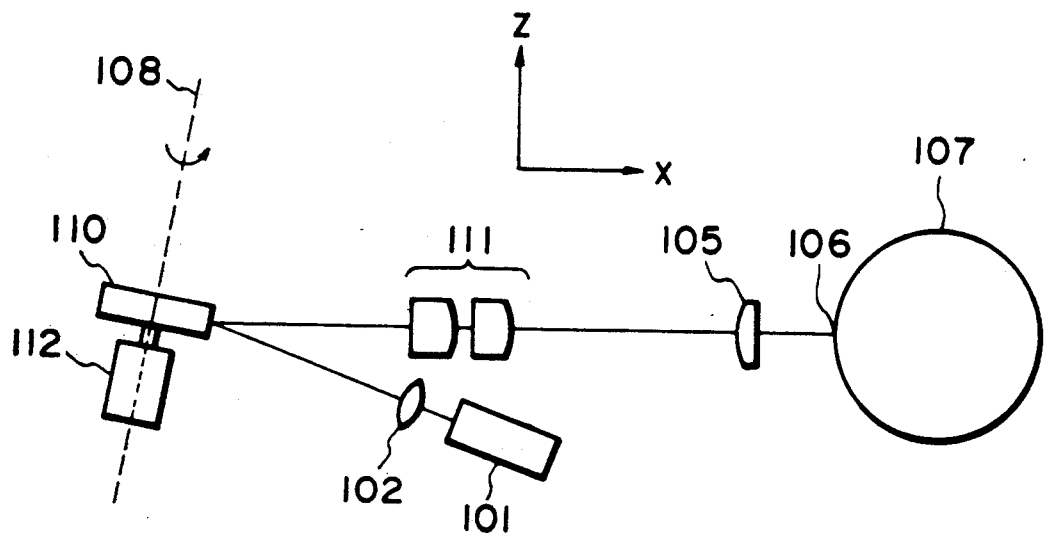
Figure 20:
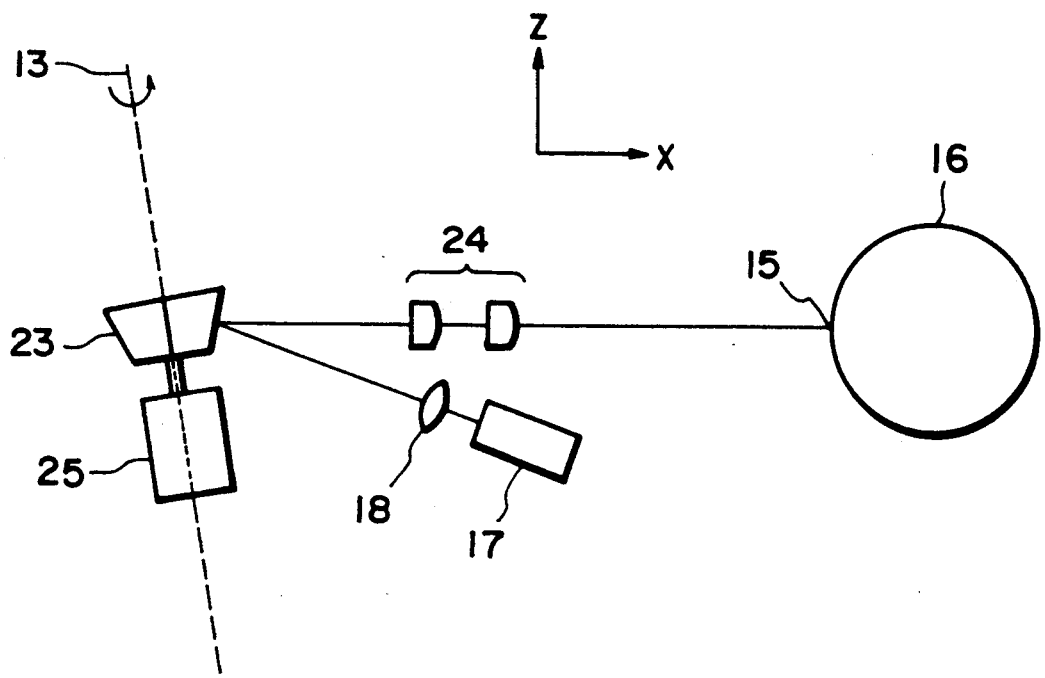
Figure 21:
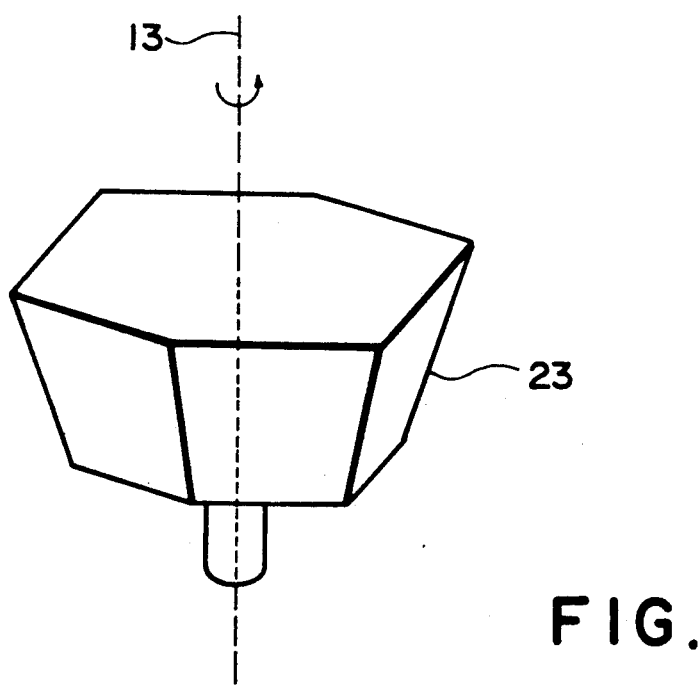

FIG. 20 shows still another embodiment of the present invention, which utilizes a polygonal mirror as a deflector. FIG. 21 is an enlarged view of a polygonal mirror 23 shown in FIG. 20. As shown in FIG. 21, a mirror surface of the polygonal mirror 23 is not parallel to a pivot axis 13. Therefore, as shown in FIG. 20, the pivot shaft 13 of the polygonal mirror is set at an angle different from those in FIGS. 2 and 3.

As shown in FIG. 20, a light beam emitted from a light source 17 is collimated into a parallel beam by a collimator lens 18, and is then incident on the mirror surface of the polygonal mirror 23. The beam is then reflected by the mirror surface, and forms an image on a surface to be scanned through an f-$\theta$ lens 24.

Figure 22:
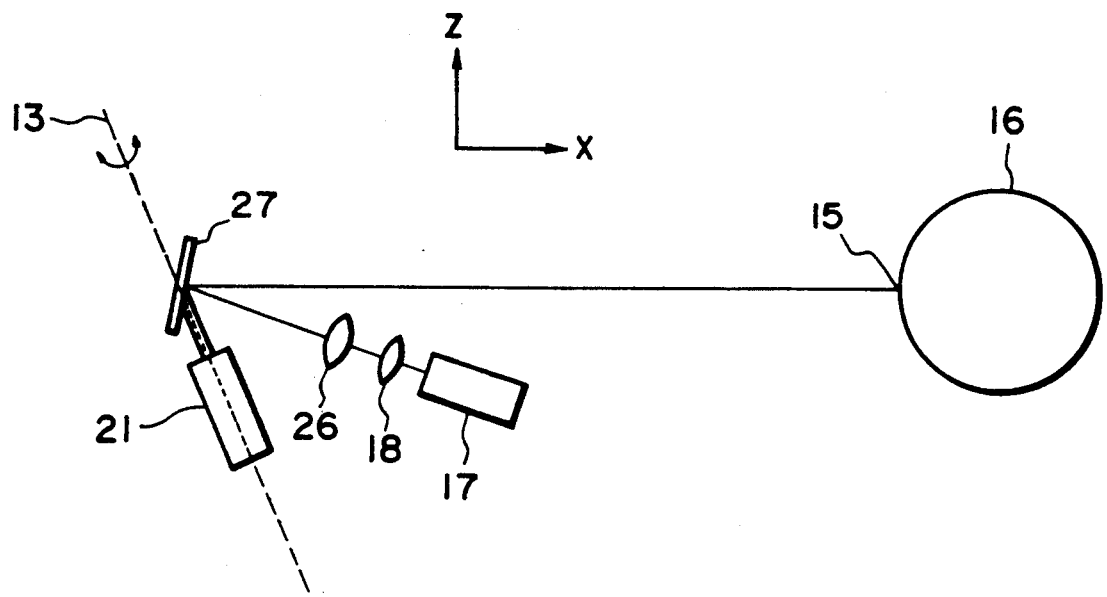

FIG. 22 shows still another embodiment of the present invention, in which the flat mirror of the galvano mirror in the embodiment shown in FIG. 16 is replaced with a convex mirror, and the arcsin$\theta$ lens is omitted.

A light beam emitted from a light source 17 is collimated into a parallel beam by a collimator lens 18, and is incident as a focused beam on a mirror 27 of the galvano mirror through an image formation lens 26. The beam is reflected by the mirror 27, and forms an image on a surface 15 to be scanned.

Figure 23:
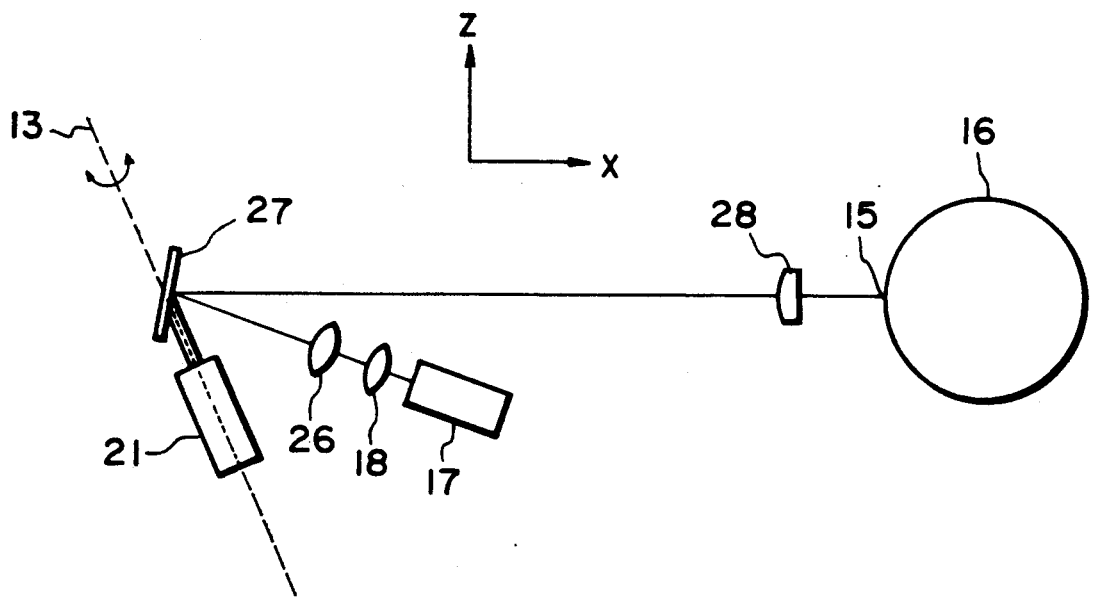

FIG. 23 shows still another embodiment of the present invention. In this embodiment, a cylindrical lens 28 is added to the embodiment shown in FIG. 22 so as to correct an inclination error of a mirror surface.

In this embodiment, a cylindrical lens is used. However, since a curve of an image surface in a z direction is smaller than that in FIG. 1 causing a curve of the image surface which has a smaller radius of curvature in the z direction, the design, manufacture, and adjustment of the cylindrical lens can be facilitated as compared to FIG. 1.

Figure 24:
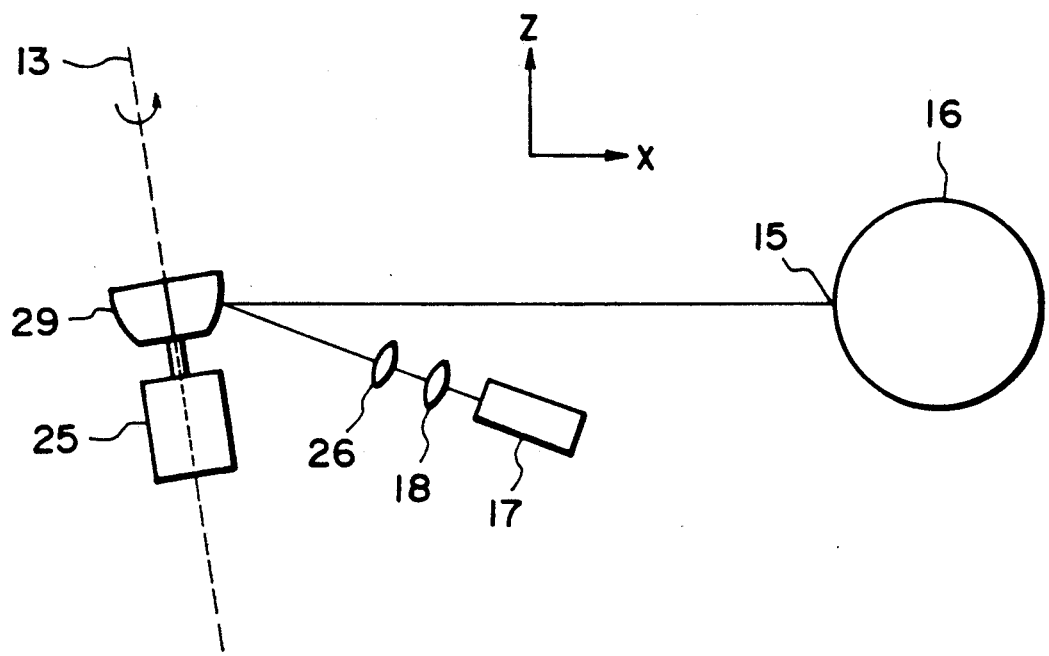

FIG. 24 shows still another embodiment of the present invention. In this embodiment, the flat mirror of the polygonal mirror of the embodiment shown in FIG. 20 is replaced with a convex mirror, and the f-$\theta$ lens is omitted.

A light beam emitted from a light source 17 is collimated into a parallel beam by a collimator lens 18, and is incident as a focused beam on a mirror surface of a polygonal mirror 29 through an image formation lens 26. The beam is reflected by the mirror surface of the polygonal mirror 29, and forms an image on a surface 15 to be scanned. The polygonal mirror 29 is rotated about a pivot axis 13 by a mirror driver 25.

Figure 25:
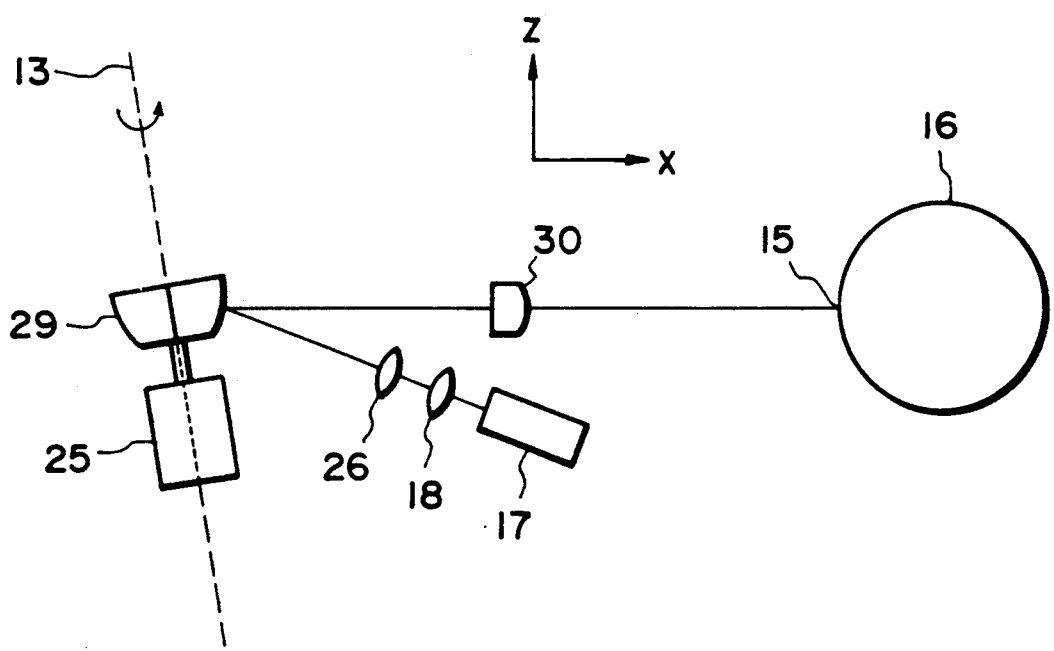

FIG. 25 shows still another embodiment of the present invention. In this embodiment, a spherical lens 30 is added to the embodiment shown in FIG. 24 to correct degradation of f-$\theta$ characteristics.

As described above, according to the present invention, the pivot axis and the mirror surface of the deflector are inclined to have a predetermined relationship, thus obtaining practical planeness of a surface to be scanned. As a result, the design of a lens system from the deflector to the surface to be scanned can be facilitated or omitted.

What is claimed is:

1. A scanning optical system comprising:
   a light source;
   a lens for converging a light beam from said light source; and
   a deflector for deflecting the converged light beam from said lens in a predetermined direction, said deflector having a deflection/reflection surface which sinusoidally oscillates,
   wherein when a maximum deflection angle of said deflector is represented by $\psi_{max}$ a within a deflection plane of said deflector, the following condition is satisfied:

$$38° \leq \psi_{max} \leq 50°$$

2. A system according to claim 1, wherein when the maximum deflection angle of said deflector is represented by $\psi_{max}$ within the deflection plane of said deflector, the following condition is satisfied:

$$40° \leq \psi_{max} \leq 46°$$

3. A scanning optical system comprising:
   a light source;
   a lens for converging a light beam from said light source; and
   a deflector for deflecting the converged light beam from said lens in a predetermined direction, said deflector having a deflection/reflection surface which sinusoidally oscillates,
   wherein when a curvature of the deflector is represented by $\psi_{max}$, a radius of curvature of the deflection/reflection surface of said deflector is represented by r, and a distance between an object point of a light beam incident on the deflection/reflection surface of said deflector and the deflection/reflection surface for reflecting a central ray of the incident light beam is represented by s in a deflection plane of said deflector, the following condition is satisfied:

$$38° \leq \psi_{max} \leq 50°$$

$$0.35 \leq s/r \leq 0.45$$

4. A system according to claim 3, wherein when a radius of curvature of the deflection/reflection surface of said deflector is represented by r, and a distance between an object point of a light beam incident on the deflection/reflection surface of said deflector and the deflection/reflection surface for reflecting a central ray of the incident light beam is represented by s in a deflection plane of said deflector, the following condition is satisfied:

$$0.38 \leq s/r \leq 0.42$$

5. A system according to claim 3, wherein when the maximum deflection angle of said deflector is represented by $\psi_{max}$ within the deflection plane of said deflector, the following condition is satisfied:

$$40° \leq \psi_{max} \leq 46°.$$

6. A scanning optical system comprising:
a light source;
a lens for converging a light beam from said light source; and
a deflector for deflecting the light beam from said light source in a predetermined direction, said deflector having a deflection/reflection surface and being pivoted about a predetermined axis, and the predetermined axis and the light beam incident on the deflector being present within a single plane,
wherein when the light beam incident on said deflector and a light beam emerged from said deflector are present within a single plane, if an angle defined by the predetermined axis and the deflection/reflection surface of said deflector is represented by $\beta$ and an incident angle of the light beam from said light source to the deflection/reflection surface of said deflector is represented by $\alpha$ within a plane including the predetermined axis and perpendicular to a deflection plane, the following condition is satisfied:

$$0.5 \times 2\alpha < \beta < 1.2 \times 2\alpha$$

7. A system according to claim 6, wherein the following condition is further satisfied:

$$0.8 \times 2\alpha < \beta < 1.1 \times 2\alpha$$

8. A laser beam printer apparatus comprising:
a light source;
a lens for converging a light beam from said light source;
a deflector for deflecting the light beam from said light source in a predetermined direction, said deflector having a deflection/reflection surface which sinusoidally oscillates; and
a recording medium for receiving the light beam deflected by said deflector, wherein when a maximum deflection angle of said deflector is represented by $\Psi_{max}$ within a deflection plane of said deflector, the following condition is satisfied:

$$38° \leq \Psi_{max} \leq \text{—}°$$

9. An apparatus according to claim 8, wherein when the maximum deflection angle of said deflector is represented by $\Psi_{max}$ within the deflection plane of said deflector, the following condition is satisfied:

$$40° \leq \Psi_{max} \leq 46°$$

10. An apparatus according to claim 8, wherein said recording medium is a photosensitive member.

11. A laser beam printer apparatus comprising:
a light source;
a lens for converging a light beam from said light source;
a deflector for deflecting the light beam from said light source in a predetermined direction, said deflector having a deflection/reflection surface which sinusoidally oscillates; and
a recording medium for receiving the light beam defected by said deflector, wherein when a maximum deflection angle of said deflector is presented by $\Psi_{max}$, a radius of curvature of the deflection/reflection surface of said deflector is represented by r, and a distance between an object point of a light beam incident on the deflection/reflection surface of said deflector and the defection/reflection surface for reflecting a central ray of the incident light beam is represented by s in a deflection plane of said deflector, the following conditions are satisfied:

$$38° \leq \Psi_{max} \leq 50°$$

$$0.35 \leq s/r \leq 0.45$$

12. An apparatus according to claim 11, wherein said recording medium is a photosensitive member.

13. An apparatus according to claim 11, wherein when a radius of curvature of the deflection/reflection surface of said deflector is represented by r, and a distance between an object point of a light beam incident on the deflection/reflection surface of said deflector and the deflection/reflection surface for reflecting a central ray of the incident light beam is represented by s in a deflection plane of said deflector, the following condition is satisfied:

$$0.38 \leq s/r \leq 0.42$$

14. An apparatus according to claim 11, wherein when the maximum deflection angle of said deflector is represented by $\Psi_{max}$ within the deflection plane of said deflector, the following condition is satisfied:

$$40° \leq \Psi_{max} \leq 46°$$

15. A laser beam printer apparatus comprising:
a light source;
a lens for converging a light beam from said light source;
a deflector for deflecting the light beam from said light source in a predetermined direction, said deflector having a deflection/reflection surface and being pivoted bout a predetermined axis, and the predetermined axis and the light beam incident on the deflector being present within a single plane; and
a recording medium for receiving the light beam deflected by said deflector, wherein when the light beam incident on said deflector and a light beam emerged from said deflector are present within a single plane, if an angle defined by the predetermined axis and the deflection/reflection surface of said deflector is represented by $\beta$ and an incident angle of the light beam from said light source to the deflection/reflection surface of said deflector is represented by $\alpha$ within a plane including the predetermined axis and perpendicular to a deflection plane, the following condition is satisfied:

$$0.5 \times 2a < \beta < 1.2 \times 2a$$

16. An apparatus according to claim 15, wherein the following condition is further satisfied:

$$0.8 \times 2a < \beta < 1.1 \times 2a$$

17. An apparatus according to claim 15, wherein said recording medium is a photosensitive member.

* * * * *

UNITED STATES PATENT AND TRADEMARK OFFICE
CERTIFICATE OF CORRECTION

PATENT NO.  : 5,066,083
DATED       : November 19, 1991
INVENTOR(S) : Jun Makino & Masamichi Tateoka It is certified that error appears in the above-identified patent and that said Letters Patent is hereby corrected as shown below:

IN THE ABSTRACT:

Line 6, change "inhvention" to --invention--.

Column 3, line 38, change "0.5 X 2α < β < 1.2 X 2β" to --0.5 X 2α < β < 1.2 X 2α--.

Column 6, line 56, change the equation from $$\Delta = \frac{sr(r-2s)(2\cos^3\psi - \cos\psi) - r\cos\psi + 2s}{(r\cos\psi - 2s)(r-2s)}$$

to $$\Delta = \frac{sr[(r-2s)(2\cos^3\psi - \cos\psi) - r\cos\psi + 2s]}{(r\cos\psi - 2s)(r-2s)}$$

Column 8, line 48, delete "radius of"; and
line 49, change "the curvature" to --the radius of curvature--.

Column 9, line 60, change "values ß" to --values β--; and
line 63, change "corresponding ß," to --corresponding β,--.

UNITED STATES PATENT AND TRADEMARK OFFICE
CERTIFICATE OF CORRECTION

PATENT NO. : 5,066,083
DATED : November 19, 1991
INVENTOR(S) : Jun Makino & Masamichi Tateoka It is certified that error appears in the above-identified patent and that said Letters Patent is hereby corrected as shown below:

Column 10, line 1, change "0" to --$\theta$--; and
line 19, change "curvature 4" to --curvature r--.

Column 16, line 24, delete the first occurence of "a";
line 46, change "curvature of the" to --maximum deflection angle of said--;
line 54, change "condition" to --conditions--; and
line 55, change "is" to --are--.

Column 17, line 56, change "38° $\leq \psi_{max} \leq$ =°" to --38° $\leq \psi_{max} \leq$ 50°--.

Column 18, line 8, change "defected" to --deflected--;
line 9, change "presented" to --represented--; and
line 53, change "bout" to --about--.

Signed and Sealed this

Thirteenth Day of July, 1993

Attest:

MICHAEL K. KIRK

*Attesting Officer*  *Acting Commissioner of Patents and Trademarks*